United States Patent
Higgs, III et al.

(10) Patent No.: US 12,366,842 B2
(45) Date of Patent: Jul. 22, 2025

(54) SYSTEM AND METHOD FOR DESIGN OF RAPID EXCAVATING AND WEAR-RESISTANT DRILL BITS

(71) Applicant: William Marsh Rice University, Houston, TX (US)

(72) Inventors: Fred C. Higgs, III, Houston, TX (US); Prathamesh S. Desai, Houston, TX (US)

(73) Assignee: William Marsh Rice University, Houston, TX (US)

( * ) Notice: Subject to any disclaimer, the term of this patent is extended or adjusted under 35 U.S.C. 154(b) by 447 days.

(21) Appl. No.: 17/631,373

(22) PCT Filed: Jul. 30, 2020

(86) PCT No.: PCT/US2020/044267
§ 371 (c)(1),
(2) Date: Jan. 28, 2022

(87) PCT Pub. No.: WO2021/022042
PCT Pub. Date: Feb. 4, 2021

(65) Prior Publication Data
US 2022/0334552 A1 Oct. 20, 2022

Related U.S. Application Data

(60) Provisional application No. 62/880,381, filed on Jul. 30, 2019.

(51) Int. Cl.
*G05B 19/4099* (2006.01)
*B33Y 50/00* (2015.01)
(Continued)

(52) U.S. Cl.
CPC .......... *G05B 19/4099* (2013.01); *B33Y 50/00* (2014.12); *E21B 10/42* (2013.01);
(Continued)

(58) Field of Classification Search
CPC ...... G05B 19/4099; G05B 2219/49023; B33Y 50/00; E21B 10/42; E21B 49/00; E21B 2200/20; E21B 10/00
See application file for complete search history.

(56) References Cited

U.S. PATENT DOCUMENTS

2007/0093996 A1* 4/2007 Cariveau ................. E21B 10/55
703/7
2016/0314420 A1* 10/2016 Livescu .................. E21B 44/00
(Continued)

FOREIGN PATENT DOCUMENTS

| AU | 2013274606 B2 * | 9/2015 | ............ E21B 44/00 |
| AU | 2013403373 B2 * | 12/2016 | ............ E21B 21/08 |
| CA | 2861102 A1 * | 7/2013 | ............ C06B 25/34 |

*Primary Examiner* — Charles R Kasenge
(74) *Attorney, Agent, or Firm* — 24IP Law Group USA, PLLC; Timothy R DeWitt

(57) ABSTRACT

A method for designing lithology-specific drill bits. The method creates an experimentally verified multiphysics model to predict drilling into site-specific rock formations. A physics-based, Eulerian-Lagrangian computational modeling framework to predict particle flow and tribological phenomena. The method uses this multiphysics model to generate virtual drilling data and then generates a machine learning enabled surrogate model of the physics-based model using the data from virtual drilling to provide design charts for drill bits.

8 Claims, 20 Drawing Sheets

(51) Int. Cl.
　　　*E21B 10/42*　　　(2006.01)
　　　*E21B 49/00*　　　(2006.01)
(52) U.S. Cl.
　　　CPC .......... *E21B 49/00* (2013.01); *E21B 2200/20* (2020.05); *G05B 2219/49023* (2013.01)

(56)　　　　References Cited

U.S. PATENT DOCUMENTS

2018/0002986 A1* 1/2018 Zhang ..................... E21B 10/43
2020/0320390 A1* 10/2020 Huang .................. G06F 18/214

* cited by examiner

SYSTEM AND METHOD FOR DESIGN OF RAPID EXCAVATING AND WEAR-RESISTANT DRILL BITS

CROSS-REFERENCE TO RELATED APPLICATIONS

The present application claims the benefit of the filing date of U.S. Provisional Patent Application Ser. No. 62/880,381 filed by the present inventors on Jul. 30, 2019.

The aforementioned provisional patent application is hereby incorporated by reference in its entirety.

STATEMENT REGARDING FEDERALLY SPONSORED RESEARCH OR DEVELOPMENT

None.

BACKGROUND OF THE INVENTION

Field of the Invention

The present invention relates to design of excavating drill bits, and more particularly, to a system and method for designing excavating drill bits.

Brief Description of the Related Art

The process of drilling a hole in the earth crust, either horizontally or vertically, is referred to as rock excavation. Over the last many years, petroleum companies have been trying to find ways to efficiently drill through the rocks to reach the fossil fuel rich geologic formations to recover oil and gas. The energy rich geologic formations are usually located deep inside the earth's crust and drilling a hole to reach these formations consumes significant portion, as high as 50%, of the entire crude oil extraction time. See, Lyons, K. D.; Honeygan, S.; Mroz, T., "NETL extreme drilling laboratory studies high pressure high temperature drilling phenomena," Journal of Energy Resources Technology 2008, 130, 043102. Drilling action involves rapid impact of the rotating drill bit against the rock formation at high temperature and pressure in the presence of drilling fluids and can result in the fracture of individual cutters which makeup the bit. If a significant number of cutters break midway to the drilling process to reach the energy rich geological formation, then the drill bit can no longer excavate the rock formation. This results in stalling of the excavation and considerable time and money is lost in replacing the drill bit. See, Lyons, et al. Thus, there is a need to optimize the drill bit's penetrating action or rate of penetration (RoP), which is a function of the material composition of the bit and its geometrical design and operating parameters such as the weight on the bit (WoB) and revolutions per minute (rpm) of the bit. Most of the times, there is a physical limit to maximum values of WoB and rpm, but an optimally designed drill bit geometry is able to exceed the RoP that can be obtained by an optimization of operating parameters alone. This optimization process is highly dependent on the rock formation or lithology which is being drilled into and is not yet completely understood. See, Endres, L. A., "Computation modeling of drill bits: A new method for reproducing bottom hole geometry and a second-order explicit integrator via composition for coupled rotating rigid bodies," PhD thesis, University of California, San Diego, 2007; Bobet, A., "Numerical methods in geomechanics," The Arabian Journal for Science and Engineering 2010, 35, 27-48; and Joodi, B.; Sarmadivaleh, M.; Rasouli, V.; Nabipour, A., "Simulation of the cutting action of a single PDC cutter using DEM," WIT Transactions on Engineering Sciences 2012, 81, 143-150). Rock formations vary a lot based on geographical location and even vary significantly with the excavation distance at any given location. This is indicated by rock core sampling data. In other words, there is no single best drill bit design that can give maximum RoP anywhere on the earth. There is a need to understand the wear mechanism of both, the rocks and the cutters making up the drill bit, and predict a wear-resistant, lithology-specific drill bit geometry for a particular excavation and eventually additively manufacture this drill bit or use traditional manufacturing.

A few rock excavation studies in the literature have been focused around drilling muds, vertical turret lathe testing of cutters and bit-on-rock tribometry. See, Teale, R., "The concept of specific energy in rock drilling," International Journal of Rock Mechanics and Mining Sciences & Geomechanics Abstracts. Elsevier, 1965, Vol. 2, pp. 57-73, Appl, F.; Wilson, C. C., Lakshman, I., "Measurement of forces, temperatures and wear of PDC cutters in rock cutting," Wear 1993, 169, 9-24; Rafatian, N., et al., "Experimental study of MSE of a single PDC cutter interacting with rock under simulated pressurized conditions," SPE Drilling & Completion 2010, 25, 10-18; Dougherty, P. S.; Pudjoprawoto, R.; Higgs, C. F., "Bit cutter-on-rock tribometry: analyzing friction and rate-of-penetration for deep well drilling substrates," Tribology International 2014, 77, 178-185; Dougherty, P. S., Mpagazehe, J., Shelton, J., Higgs III, C. F., "Elucidating PDC rock cutting behavior in dry and aqueous conditions using tribometry," Journal of Petroleum Science and Engineering 2015, 133, 529-542; and Abbas, R. K., "A review on the wear of oil drill bits (conventional and the state of the art approaches for wear reduction and quantification)," Engineering Failure Analysis 2018, 90, 554-584. While these tests are relatively easy to perform, they do not simulate the real conditions seen by a drill bit which has a rotary action as opposed to the translation loading as in the vertical turret lathe testing, very high weight on bit as opposed to bit-on-rock tribometry at low loads and occurs in a high temperature and high pressure subsurface environment. The wear of a bit caused directly by the rotary action should be considered in concert with the impacts of the drilled rock pieces as these are being carried out by the drilling fluids. This problem has a cutter-on-rock interface filled with drilling fluids and rock cuttings. This is a particle-fluid-structure interaction problem covering the tribological phenomena like three body wear and hydrodynamic lubrication, fracture mechanics of rocks and fluid mechanics and cooling efficiency of the drilling mud, as shown in FIG. 1. Data from real oil wells can be analyzed for studying this multiphysics problem, but experiments at the mega-scale of oil well are not practically and economically feasible. A benchtop drilling apparatus is able to capture the particle-fluid-structure interactions encountered in rock drilling, albeit at miniaturized scale. See, Lee, J.; Shadravan, A., et al., "Rheological properties of invert emulsion drilling fluid under extreme HPHT conditions," IADC/SPE Drilling Conference and Exhibition, Society of Petroleum Engineers, 2012; Ezeakacha, C., et al., "Investigating Impact of Rock Type and Lithology on Mud Invasion and Formation Damage," SPE International Conference and Exhibition on Formation Damage Control, Society of Petroleum Engineers, 2018; and Ezeakacha, C. P., et al. "A New Approach to Characterize Dynamic Drilling Fluids Invasion Profiles in Application to Near-Wellbore Strengthening Effect," IADC/SPE Drilling Conference and Exhibition, Society of Petroleum Engineers, 2018.

In 2010, Bobet provided a thorough review of the existing computational methods used to model rocks and soils. Bobet, A., "Numerical methods in geomechanics," The Arabian Journal for Science and Engineering 2010, 35, 27-48. The cutter-and-rock interface has rock cuttings along with fluids which need to be accounted for. Rock cuttings can be better modeled by following a Lagrangian modeling approach as in the Discrete Element Method (DEM). See, Cundall, P. A.; Strack, O. D., "A discrete numerical model for granular assemblies. Geotechnique," 1979, 29, 47-65; Cundall, P. A., Hart, R. D., "Development of generalized 2-D and 3-D distinct element programs for modeling jointed rock," Technical report, ITASCA CONSULTING GROUP INC MINNEAPOLISMN, 1985, and Potyondy, D.; Cundall, P., "A bonded-particle model for rock. International journal of rock mechanics and mining sciences," 2004, 41, 1329-1364. A few researchers have tried using explicit finite element method to model the rock cuttings. See, Endres, L. A., "Computation modeling of drill bits: A new method for reproducing bottom hole geometry and a second-order explicit integrator via composition for coupled rotating rigid bodies," PhD thesis, University of California, San Diego, 2007; and Menezes, P. L., Lovell, M. R., Avdeev, I. V., Higgs, C. F., "Studies on the formation of discontinuous rock fragments during cutting operation," International Journal of Rock Mechanics and Mining Sciences 2014, 71, 131-142. However, the unavailability of known simple constitutive law for different rock types makes this approach difficult to implement. While some researchers have modeled the crushability of rocks, mass and volume conservation of these crushable particles is not trivially possible. See, Rojek, J., Onate, E., Labra, C., Kargl, H., "Discrete element simulation of rock cutting," International Journal of Rock Mechanics and Mining Sciences 2011, 48, 996-1010; Vesga, L. F., Vallejo, L. E., Lobo-Guerrero, S., "DEM analysis of the crack propagation in brittle clays under uniaxial compression tests," International journal for numerical and analytical methods in geomechanics 2008, 32, 1405-1415; and Mendoza, J. S., "Modelling deformation, porosity and elastic constants in porous rocks," PhD thesis, Stanford University, 1987. Most of the drilling simulation studies have focused on drilling action of a single cutter rather than the entire drill bit. See, Joodi, B.; Sarmadivaleh, M.; Rasouli, V.; Nabipour, A., "Simulation of the cutting action of a single PDC cutter using DEM," WIT Transactions on Engineering Sciences 2012, 81, 143-150; and Rojek, J.; Onate, E.; Labra, C.; Kargl, H., "Discrete element simulation of rock cutting," International Journal of Rock Mechanics and Mining Sciences 2011, 48, 996-1010). In 2007, Endres proposed another continuum-like model for simulating rock drilling using an entire bit. Endres, L. A., "Computation modeling of drill bits: A new method for reproducing bottom hole geometry and a second-order explicit integrator via composition for coupled rotating rigid bodies," PhD thesis, University of California, San Diego, 2007. The added complexity by usage of models based on continuum approximation and introduction of crushable particles with nonlinear contact models in DEM does not provide any better predictions than simpler DEM models which make use of uncrushable particles having uniform size and which are bound together by weak concrete-like bonds coupled with a robust calibration and validation process. These virtual avatars of real rocks can then be made available to perform virtual drilling similar to the one seen in a benchtop drilling simulator by incorporating drilling mud behavior via computational fluid dynamics (CFD), as has been done in the present study. A few studies have modeled the physics of drilling fluid along with rock dynamics. See, Mpagazehe, J. N.; Queiruga, A. F.; Higgs, C. F. Towards an understanding of the drilling process for fossil fuel energy: A continuum-discrete approach. Tribology International 2013, 59, 273-283, and Marina, S.; Imo-Imo, E. K.; Derek, I.; Mohamed, P.; Yong, S. Modelling of hydraulic fracturing process by coupled discrete element and fluid dynamic methods. Environmental Earth Sciences 2014, 72, 3383-3399.

There have been a few studies making use of machine learning to study rock mechanics. S. Levasseur, Y. Malécot, M. Boulon and E. Flavigny, "Soil parameter identification using a genetic algorithm," International Journal for Numerical and Analytical Methods in Geomechanics 2008, 32, 189-213; F. Meulenkamp, M. A. Grima, "Application of neural networks for the prediction of the unconfined compressive strength (UCS) from Equotip hardness," International Journal of rock mechanics and mining sciences 1999, 36, 29-39; V. Singh, D. Singh and T. Singh, "Prediction of strength properties of some schistose rocks from petrographic properties using artificial neural networks," International Journal of Rock Mechanics and Mining Sciences 2001, 38, 269-284, Yang, Y.; M. Rosenbaum, "The artificial neural network as a tool for assessing geotechnical properties," Geotechnical and Geological Engineering 2002, 20, 149-168; Y. K. Gidh, et al., "Real-time drilling parameter optimization system increases ROP by predicting/managing bitwear," SPE Digital Energy conference and Exhibition, Society of Petroleum Engineers, 2011; and A. Bhatnagar, and M. Khandelwal, "An intelligent approach to evaluate drilling performance," Neural Computing and Applications 2012, 21, 763-770. Machine learning has either been used to calibrate the physics-based model to the real results, like the crushing strength of rock (see, Meulenkamp, F.; Grima, M. A. Application of neural networks for the prediction of the unconfined compressive strength (UCS) from Equotip hardness. International Journal of rock mechanics and mining sciences 1999, 36, 29-39) or shear strength of soil (see, Levasseur, S.; Malécot, Y.; Boulon, M.; Flavigny, E. Soil parameter identification using a genetic algorithm. International Journal for Numerical and Analytical Methods in Geomechanics 2008, 32, 189-213), or it has been used to guide the drilling process based on sensor data (see, Bello, O.; Teodoriu, C.; Yaqoob, T.; Oppelt, J.; Holzmann, J.; Obiwanne, A.; others. Application of Artificial Intelligence Techniques in Drilling System Design and Operations: A State of the Art Review and Future Research Pathways. SPE Nigeria Annual International Conference and Exhibition. Society of Petroleum Engineers, 2016, Gidh, Y. K.; Ibrahim, H.; Purwanto, A.; others. Real-time drilling parameter optimization system increases ROP by predicting/managing bit wear. SPE Digital Energy conference and Exhibition. Society of Petroleum Engineers, 2011, and Bhatnagar, A.; Khandelwal, M. An intelligent approach to evaluate drilling performance. Neural Computing and Applications 2012, 21, 763-770). The latter mandates the availability of past drilling data and can only optimize the drilling process parameters like WoB and rpm and cannot help in predicting a newer and more optimal drill bit design geometry. There is also the problem of trial and error associated with such studies. Pichler in 2003 (see, Pichler, B.; Lackner, R.; Mang, H. A. Soft-computing-based parameter identification as the basis for prognoses of the structural behaviour of tunnels. In Numerical simulation in tunnelling; Springer, 2003; pp. 201-223) made predictions by assuming the rock formation to behave as a continuum. Treatment of rock as discrete medium is more realistic than continuum assumption (see, Bobet, A. Numerical methods in geomechanics. The Arabian Journal for Science and Engineering 2010, 35, 27-48).

SUMMARY OF THE INVENTION

A synergistic, three-step approach is used in connection with rock excavation. The first step involves the characterization of the lithology of the rock to be encountered at the real drilling site, using a point load strength test and usage of the data from this test for calibrating a DEM-based virtual rock, i.e., a virtual avatar of the real rock, which has similar lithological behavior to the real rock. The second step involves the drilling simulation study on this virtual rock, which has been calibrated for its point load strength and comparison to a realistic drilling experiment. Finally, the simulation data can be used to train and test regression algorithms based on machine learning, like back propagation neural networks (BP-NN), to generate lithology-specific drill bit design charts. These charts can be used to find the drill bit shape optimized for its RoP.

In a preferred embodiment, the present invention is a method for designing lithology-specific drill bits. The method comprises generating an experimentally verified multiphysics model of a drill site to predict drilling into site-specific rock formations, using a physics-based, Eulerian-Lagrangian computational modeling framework to predict particle flow and tribological phenomena at the drill site, generating virtual drilling data associated with the drill site using the multiphysics model, generating a machine learning enabled surrogate model of the physics-based model of the drill site using the generated virtual drilling data, and generating a drill bit design chart using said machine learning enabled surrogate model. The method may further comprise 3-D printing a drill bit in accordance with said drill bit design chart or using conventional drill bit manufacturing to manufacture a drill bit in accordance with said drill bit design chart. Still further, the method additionally may comprise using said drill bit chart as a lookup chart for drill scheduling software.

In another preferred embodiment, the present invention comprises a method for designing rock-specific drill bits. The method comprises characterizing rocks encountered at a drill site, performing experimental benchtop rock drilling, performing virtual drilling, comparing results of said virtual drilling with results of said experimental benchtop rock drilling, generating a machine learning model, and outputting a drill bit design chart. The method may further comprise 3-D printing a drill bit in accordance with said drill bit design chart or manufacturing a drill bit by other methods in accordance with the drill bit design chart. Still further, the method may additionally comprise using the drill bit chart as a lookup chart for drill scheduling software.

Still other aspects, features, and advantages of the present invention are readily apparent from the following detailed description, simply by illustrating a preferable embodiments and implementations. The present invention is also capable of other and different embodiments and its several details can be modified in various obvious respects, all without departing from the spirit and scope of the present invention. Accordingly, the drawings and descriptions are to be regarded as illustrative in nature, and not as restrictive. Additional objects and advantages of the invention will be set forth in part in the description which follows and in part will be obvious from the description or may be learned by practice of the invention.

BRIEF DESCRIPTION OF THE DRAWINGS

For a more complete understanding of the present invention and the advantages thereof, reference is now made to the following description and the accompanying drawings, in which:

FIG. 10A shows computational domain size and boundary conditions, FIG. 10B shows OpenFOAM body-fitted mesh with 70,000 finite volume elements and FIG. 10C shows P-STAC mesh with only 23,000 finite difference elements.

FIG. 17A is a BP-NN regressed surface, FIG. 17B is a graph of the training data and FIG. 17C is a graph of the test data.

FIG. 18A is a BP-NN regressed surface, FIG. 18B is a graph of the training data and FIG. 18C is a graph of the test data.

DETAILED DESCRIPTION OF THE PREFERRED EMBODIMENTS

Studying the rock excavation step of oil and gas recovery process can be difficult, not only experimentally but also computationally. It is difficult to study this experimentally as the in-situ visualization of the drill bit-rock interface is practically impossible. Also, the rocks encountered in nature are highly heterogeneous and thus pose a challenge to extrapolate the data obtained from benchtop drilling rigs. Conducting drilling experiments at real scale is also economically not feasible. A computational study of this problem is equally challenging as the discrete element method (DEM), best suited to study this problem, is based on Lagrangian principles and has no well-defined constitutive law for rocks. See, A. Bobet, "Numerical methods in geomechanics," The Arabian Journal for Science and Engineering 2010, 35, 27-48; P. A. Cundall, O. D. Strack, "A discrete numerical model for granular assemblies," Geotechnique 1979, 29, 47-65; P. A. Cundall, R. D. Hart, "Development of generalized 2-D and 3-D distinct element programs for modeling jointed rock," Technical report, ITASCA CONSULTING GROUP INC MINNEAPOLISMN, 1985; and C. Coetzee, "Calibration of the discrete element method," Powder Technology 2017, 310, 104-142. A typical rock core a few inches in dimensions can easily have millions of particles or grains.

The present invention introduces a new process to do exploratory design search, enabled by machine learning, for lithology-specific drill bits and eventually additively manufacturing or 3D printing the optimized drill bit design candidate. This process comprises creating an experimentally verified multiphysics model to predict drilling into site-specific rock formations. See, E. J. Terrell and C. F. Higgs, "A particle-augmented mixed lubrication modeling approach to predicting chemical mechanical polishing. Journal of tribology," 131(1), 012201 (2009); J. N. Mpagazehe, "A physics-based, Eulerian-Lagrangian computational modeling framework to predict particle flow and tribological phenomena," PhD thesis, Carnegie Mellon University (2013); and P. Desai, "Tribosurface Interactions involving Particulate Media with DEM-calibrated Properties: Experiments and Modeling," PhD thesis, Carnegie Mellon University (2013).

Then using this multiphysics model to generate virtual drilling data, akin to sensor data from real drilling albeit cheaply and with no accidental risks which are associated with real drilling. Finally, generating a machine learning enabled surrogate model of the physics-based model by using the data from virtual drilling, to provide design charts for drill bits.

Figure 1:
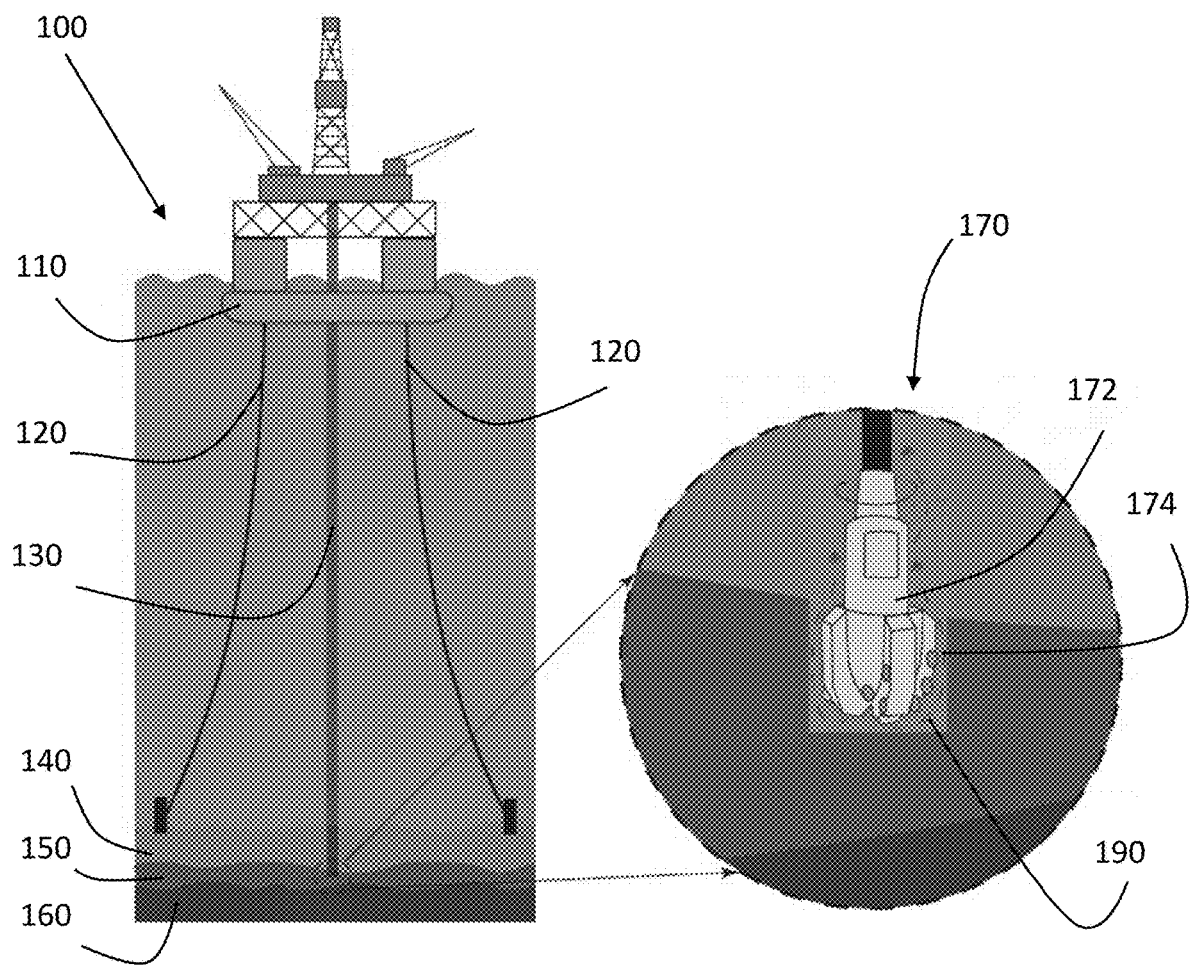
FIG. 1 is a schematic of a typical offshore rig that may be used in connection with preferred embodiments of the present invention.

FIG. 1 illustrates a typical drilling environment in which the present invention may be used. A typical offshore oil rig 100 has a floating platform 110, anchor lines 120 and a drilling pipe 130. The oil rig needs to drill through varying rock formations like 140, 150 to ultimately reach the energy-rich reserve 160. The inset 170 shows a polycrystalline diamond compact (PDC) drill bit 172 drilling into rock 150 with the drilling interface comprised of the cutters 174, rock 150 and drilling fluid 190. This interface forms what is known as a tribosystem. In order to provide drilling predictions, this tribosystem must be modeled accurately, be it via theory, experiments or computational models.

Figure 2:
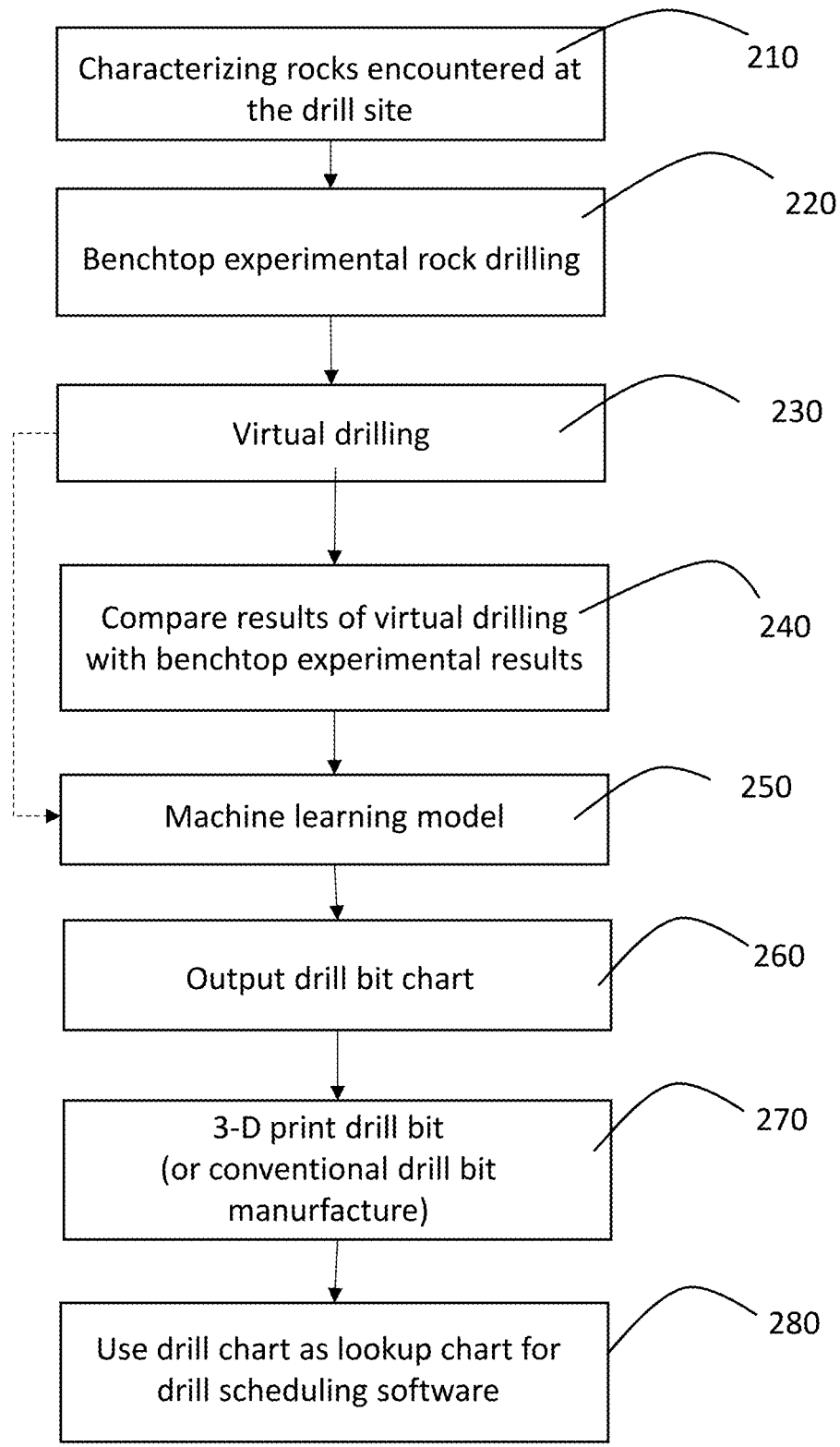
FIG. 2 is a flow chart of a method in accordance with a preferred embodiment of the present invention.

A method in accordance with a preferred embodiment is described with reference to FIG. 2. The solution towards obtaining lithology-specific drill bit starts with characterizing the rocks to be encountered at the drill site 210 (as shown in FIG. 3). This is followed by benchtop experimental rock drilling 220 (FIG. 4), which simulates high pressure and high temperature conditions encountered at the real drilling site. Then virtual drilling 230 is performed on a virtual rock which has been calibrated for its properties measured in the characterizing the rocks to be encountered at the drill site 210. At 240, the results from 230 are verified against the results from 220. The virtual drilling step 230 also involves creation of virtual drilling data for a few drill bit designs by following what is referred to here as the Design of Simulations (DoS), similar to the well-known Design of Experiments (DoE). The virtual data from 230 feeds into the machine learning model of 250 the aim of which is to develop a surrogate model of 230. This surrogate model 250 is eventually used to sample the entire design space in a speedy way and output a layman tractable drill bit design chart as shown in 260. This generation of a drill bit design chart is computationally expensive for the multiphysics model of 230 and almost impossible for the experimental model of 220. This design chart 260 can then be used for producing the drill bit 270 via 3-D printing or conventional drill bit manufacturing. The design chart also can be used, for example, as a lookup chart for drill scheduling software 280 in the drilling phase of the oil and gas project of FIG. 1. The invention also encompasses rock drilling encountered in mining, tunneling and other related fields. It also encompasses various types of drill bits like PDC bits, roller cone bits and so on as the tribosystem encountered stays the same across various rock drilling or excavating tools.

Rock characterization 210 involves performing experimental tests which measure constitutive properties of the rock core 150, representative of the rock formation 150. Various characterization tests can be conducted like unconfined or confined compressive strength tests, shear tests and permeability tests. A preferred embodiment of the present invention makes use of two tests: point load strength test 310 and angle of crack propagation test 314, as these tests are able to capture the failure load, via point load testing and nature of failure, via crack propagation testing of rock cores or samples. Both of these rock properties are important for the study of drilling into the said rock and resulting wear of the cutters on the drill bit. Point load strength test 310, as per ASTM standard D5731-16 ("Standard test method for determination of the point load strength index of rock and application to rock strength classifications," ASTM International, West Conshohocken, PA, Standard, 2016), comprises of loading a rock sample 150, having any shape, using conical platens 312 until the rock fails due to a through-and-through crack 320 from the top face to the bottom face, stated as a valid failure of the rock. The failure load is then used to calculate the compressive strength of the rock after incorporating shape corrections. Angle of crack propagation 320 helps in understanding the rupture evolution in a rock sample 150 with an existing flaw 322 under uniform loading 324. The angle at which the secondary crack 322a is formed with respect to the primary crack or flaw 322 is referred to as the angle of crack propagation. Both these tests will be used to calibrate a virtual avatar of the rock type using bonded particle discrete element method in 230.

Rock characterization 210 helps in quantifying the rock properties but cannot shed much light on drill bit shape optimization. Thus, benchtop drilling 220 is carried out after rock characterization using a benchtop drill rig 410 on rock core 150 as seen in pre-drill (FIG. 4B) and post-drill (FIG. 4C) images. This drill rig 410 simulates drilling encountered at the real scale. It performs drilling at a given load and given rpm under high pressure (to simulate the hydrostatic pressure experienced by rock at real scale) and high temperature (to simulate the high heat flux encountered by the drill bit at the real scale). The output of the experimental drilling is rate of penetration (RoP). Wear of drill bit may also be measured.

Rock properties measured in 210 serve as the to-be-achieved values in the calibration process to obtain virtual avatar of the rock being drilled into by iteratively changing the micro-properties 532, 534, 536 and 538 these micro-properties as described below. The virtual rock is then used for virtual drilling as shown in 230. The multiphysics computational model simulates the drilling action of the drill bit 172 into rock 150 in the presence of a drilling fluid 190. The drill bit 172 is a tessellated representation of the drill bit encountered in 410 (see, Desai, P. (2017). Tribosurface Interactions involving Particulate Media with DEM-calibrated Properties: Experiments and Modeling. PhD thesis, Carnegie Mellon University), which in turn is supposed to mimic the drill bit seen at the real scale seen in FIG. 1. This multiphysics model calculates the speed of grains or particles 512 forming the rock during drilling, the bonds between these particles 514 and speed of the drilling fluid 522 by employing bonded particle discrete element method (DEM) to simulate the rock and full 3D computational fluid dynamics (CFD) to simulate the drilling fluid. Inset 530 shows the rock model where spherical particles 532 are bound together by mathematical bonds 534 which are a function of inter-particle distance. The colliding particles experience normal and tangential collision forces via deformation-based force models 536 and 538 respectively in addition to the bonding force due to bonds 534. Inset 540 shows the entrapment of the drilling fluid 190 between a cutter 174 and rock surface 150. This entrapment and the rotational motion of the drill bit result in a hydrodynamic lift which results in reduction in the weight on bit (WoB) and adversely affects the rate of penetration. The multiphysics model captures this by numerically solving the full 3D Navier-Stokes equations of fluid motion using finite differencing, immersed boundary method and adaptive mesh refinement. See, Desai, P. (2017). Tribosurface Interactions involving Particulate Media with DEM-calibrated Properties: Experiments and Modeling. PhD thesis, Carnegie Mellon University. The multiphysics model outputs the rate of penetration (RoP) and wear of bit. The model is verified against the findings from 220 and then executed for newer drill bit shapes by following a design of simulations (DoS). Since the multiphysics model is computationally expensive, the DoS samples the design space coarsely by varying the number, angle, orientation and placement of the cutters. Although bonded particle DEM and finite difference based CFD have been alluded to in this invention, other types of numerical schemes can be used for rock mechanics and fluid dynamics without losing the essence of this invention.

The virtual drilling data obtained from 230 is used to develop a much faster surrogate model 250 of the multiphysics model. Contrary to this new approach, prior studies try to develop such models by using the data obtained from highly expensive and time-consuming experiments. See, Bello, O., Teodoriu, C., Yaqoob, T., Oppelt, J., Holzmann, J., & Obiwanne, A. (2016, August). Application of Artificial Intelligence Techniques in Drilling System Design and Operations: A State of the Art Review and Future Research Pathways. In SPE Nigeria Annual International Conference and Exhibition. Society of Petroleum Engineers; Meulenkamp, F., & Grima, M. A. (1999). Application of neural networks for the prediction of the unconfined compressive strength (UCS) from Equotip hardness. International Journal of rock mechanics and mining sciences, 36(1), 29-39; Levasseur, S., Malécot, Y., Boulon, M., & Flavigny, E. (2008). Soil parameter identification using a genetic algorithm. International Journal for Numerical and Analytical Methods in Geomechanics, 32(2), 189-21; Gidh, Y. K., Purwanto, A., & Ibrahim, H. (2012, January). Artificial neural network drilling parameter optimization system improves ROP by predicting/managing bit wear. In SPE Intelligent Energy International. Society of Petroleum Engineers; and Holland, M., Hoeink, T., & Van Der Zee, W. (2017). See also, U.S. Published Patent Application No. 2017/0277812, entitled "Obtaining Micro- And Macro-Rock Properties With A Calibrated Rock Deformation Simulation."

Figure 6:
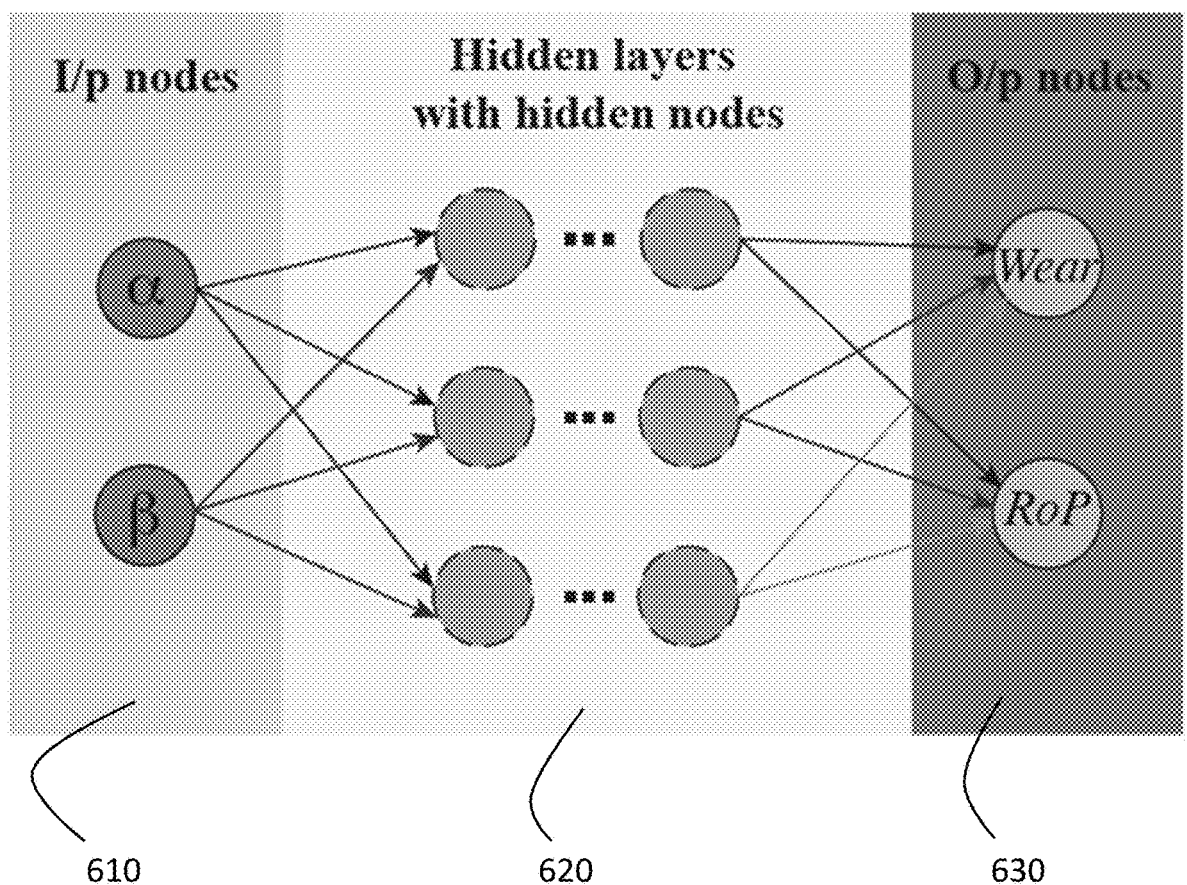
FIG. 6 illustrates a machine learning enabled surrogate model in accordance with a preferred embodiment of the present invention.

The ML surrogate may be a multi-layer neural network, as shown in FIG. 6, mapping the design parameters of the drill bit like number, angle, orientation and placement of cutters to the RoP and wear of the drill bit. Although a neural network has been alluded to in this invention, other types of multivariate regression techniques may be employed without losing the essence of this invention.

The surrogate model from 250 can now sample drill bit designs from the design space in a much more refined manner than the computationally expensive model of 230. The result is a drill bit design chart 260 shown in FIG. 7. Such a chart may plot the process variables of bit wear and RoP against the drill bit shape parameters $\alpha$ and $\beta$; both design parameters are shown in the inset 710. Such a drill bit design can serve as a lookup chart for a drill scheduling software 280 which may have depth of well, WoB, rpms, cutter failure criterion (in terms of wear), bit failure criterion (in terms of number of cutter failures), drill bit change time, cost of drill bit, leasing cost of the drill rig and rock lithology as input parameters to optimize the rock excavation constraint to minimizing the time and/or cost of excavation. It may be possible to excavate faster and/or cheaper by following a priori planned, proactive drill bit changes as suggested by this invention as opposed to posteriori, reactive drill bit changes based on sensor data while drilling.

Characterizing Rocks Encountered at the Drill Site

The rock excavation step consumes about 50% time of the entire oil and gas extraction process. There is a constant thrust to improve the efficiency of this step. Traditionally, this step has been studied using vertical turret lathe testing of a single cutter or single cutter on rock tribometry. However, there is a need to better understand the lithology-specific penetrating action of the entire drill bit, which is a function of the material composition of the bit and drilling fluid, shape of the bit and its operating parameters like weight on bit (WoB) and revolutions per minute (rpm). To experimentally study this, a benchtop rig with a miniaturized PDC drill bit was used to drill into sandstone rock cores in dry and aqueous conditions. Then a modeling framework based on bonded particle discrete element method (DEM) and computational fluid dynamics (CFD) was employed to simulate the benchtop drilling. The model accounted for loss in WoB due to hydrodynamic lubrication and has been used to provide predictions about the rate of penetration (RoP) and wear of the bit. Finally, a faster surrogate of the computationally intensive multiphysics model was developed using machine learning. This surrogate model was used for intensive sampling of the drill bit design space and generate a drill bit design chart which relates the drill bit shape parameters to the drilling outcome of RoP and wear of bit.

A multiphysics computational modeling platform known as the Particle-Surface Tribology Analysis Code (P-STAC), which has a GPU based DEM module as its particle dynamics simulation tool and a finite difference based CFD module as its fluid dynamics simulation tool, was used. The DEM approach used to simulate the rock excavation step of oil and gas recovery was based on the one developed by Cundall and Strack (see, Cundall, P. A.; Strack, O. D., "A discrete numerical model for granular assemblies," Geotechnique 1979, 29, 47-65), and has been validated in an earlier work by the present inventors. See, Desai, P. S.; Mehta, A.; Dougherty, P. S.; Higgs, C. F., "A rheometry based calibration of a first-order DEM model to generate virtual avatars of metal Additive Manufacturing (AM) powders," Powder Technology 2019, 342, 441-456.

Computational Rock Mechanics

Computational rock mechanics can be broadly divided into numerical techniques based on continuum approximation or Eulerian methods and methods based on Lagrangian principles. There is yet another hybrid technique called Finite-Discrete Element Method, which selectively treats the simulation domain as a continuum or discrete media, based on the local stress intensities. See, A. A. Munjiza, "The combined finite-discrete element method, John Wiley & Sons, 2004. The present computer experiments made use of bonded particle DEM as described below.

Bonded Particle DEM Model for Concrete-Like Rocks

Bonded particle model making use of parallel bonds has been proposed by Cundall and Potyondy in 2004 (see D. Potyondy and P. Cundall, "A bonded-particle model for rock," International journal of rock mechanics and mining sciences 2004, 41, 1329-1364), and used by many researchers. This model captures the heterogeneity of rocks by forming mathematical bonds, parallel or point, between overlapping particles. This model, though shown to have given good results in predicting rock mechanics, does not allow bonding between particles or rock grains which do not overlap but are in the vicinity of each other. Such types of bonds, which are more intuitive and realistic, akin to the cement paste binding aggregates in concrete, and in naturally occurring sandstone rocks have been employed in the current experiments. Cement paste-like mathematical bonds are formed between uniformly sized spherical, uncrushable particles. These bonds have a stiffness, referred to as $K_{bond}$, which is chosen to be a fraction of $K_n$ (Eq. 1). Here is $\gamma$ is referred to as bond stiffness factor.

$$K_{bond} = \gamma K_n \quad (1)$$

Where, $$K_n = \frac{f^2 m_{eq} V_{max}^2}{\phi^2}; f = \frac{\phi}{\Delta_{max}} \quad (2)$$

Here $m_{eq}$ stands for the equivalent mass of colliding particles, having diameter $\phi$ and constant coefficient of restitution $\varepsilon$ which is independent of impact velocity. See, R. Bharadwaj, W. R. Ketterhagen and B. C. Hancock, "Discrete element simulation study of a Freeman powder rheometer," Chemical Engineering Science 2010, 65, 5747-5756 and R. Bharadwaj, et al., "Using DEM to solve bulk material handling problems," Chemical Engineering Progress 2012, 108, 54-58. This $m_{eq}$ is one half of the harmonic mean of the individual masses. $V_{max}$ and $\Delta_{max}$ are the estimated maximum speed and inter-particle penetration for the simulation at hand. These values are usually guessed.

The bonds have strengths $\sigma_{bond,ij}$ which decay as the distance between the particles increases. Mathematically, these bond strengths are given by:

$$\sigma_{bond,ij} = \frac{\phi}{\|C_i - C_j\|} \sigma_{bond,max} \quad (3)$$

Where $\underline{C}_i$ and $\underline{C}_j$ are the position vectors of the centers of particles i and j respectively and $\sigma_{bond,max}$ is the absolute maximum bond strength. This absolute maximum bond strength is defined as the maximum force which the bond can resist before breaking:

$$\sigma_{bond,max} = \lambda K_{bond} \Delta_{max} \quad (4)$$

Here $\lambda$, is referred to as the bond strength factor. A slider is also present in the shear direction. It limits the maximum frictional force in this direction, the value of which is equal to the product of sliding friction coefficient $\mu$ and normal reaction force $\underline{F}_n$ (given by Eq. 5). It is assumed that all the interactions cause particles to slide. In other words, only the slider acts in the shear direction. Therefore, the forces along the normal ($\underline{F}_n$) and tangential ($\underline{F}_t$) directions experienced by a colliding particle with an overlap of $\Delta$ with other particles or geometries, having a relative approach speed of $\dot{\Delta}$ and a unit vector $e_t$ in shear direction can be expressed as:

$$\underline{F}_n = \begin{cases} K_n \underline{\Delta}_n - \beta_n \underline{\dot{\Delta}}_n + K_{bond} \underline{\Delta}_{bond,n}, & \text{if } K_{bond} |\underline{\Delta}_{bond}| < \sigma_{bond} \text{ (intact bond)}. \\ K_n \underline{\Delta}_n - \beta_n \underline{\dot{\Delta}}_n, & \text{for (broken bond)}. \end{cases} \quad (5)$$

$$\underline{F}_t = \begin{cases} -\mu |\underline{F}_n| e_t + K_{bond} \underline{\Delta}_{bond,t}, & \text{if } K_{bond} |\underline{\Delta}_{bond}| < \sigma_{bond} \text{ (intact bond)}. \\ -\mu |\underline{F}_n| e_t, & \text{for (broken bond)}. \end{cases} \quad (6)$$

The damping coefficient for the DEM particles is given by:

$$\beta_n = -2 \ln(\varepsilon) \left[ \frac{K_n m_{eq}}{\pi^2 + \ln(\varepsilon)^2} \right]^{\frac{1}{2}} \quad (7)$$

Rolling and twisting motion of the particles has been ignored. Around 265,000 particles initialized at a hexagonal close pack lattice are allowed to settle under gravity in a cylindrical vessel using the DEM approach described in P. S. Desai, A. Mehta, P. S. Dougherty and C. F. Higgs, "A rheometry based calibration of a first-order DEM model to generate virtual avatars of metal Additive Manufacturing (AM) powders," Powder Technology 2019, 342, 441-456. Then these are bonded as follows:

1. Form a neighborhood for every particle i;
2. Particle i will be bonded with every particle j in its neighborhood with a mathematical bond whose strength (in terms of force) is given by $\sigma_{bond,ij}$ A calibration process can be designed to iteratively change Vmax, γ and λ, to find the correct point load strength for the rock of interest. This concrete-like bonded DEM model makes use of the Particle Tessellated Surface Interaction Scheme to account for particle-structure interactions as detailed in P. Desai, "Tribosurface Interactions involving Particulate Media with DEM-calibrated Properties: Experiments and Modeling," PhD thesis, Carnegie Mellon University (2013).

Point Load Strength Test

Figure 3A:
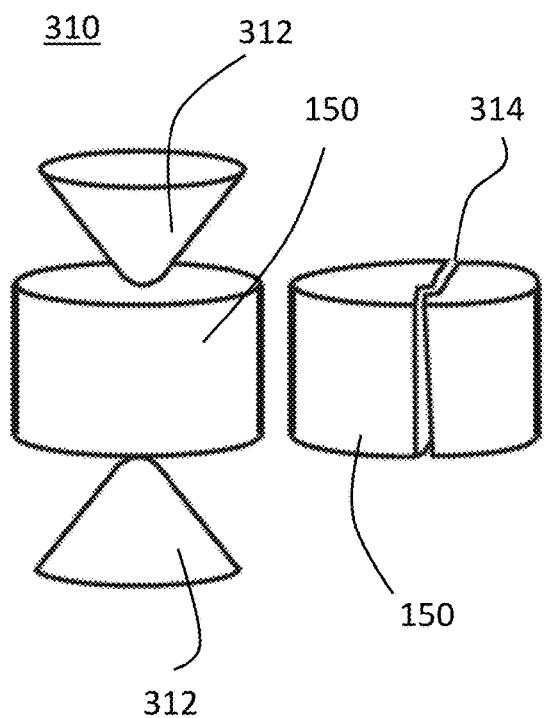
FIGS. 3A and 3B are diagrams illustrating characterization of rocks encountered at the drill site in accordance with a preferred embodiment of the present invention.
Figure 3B:
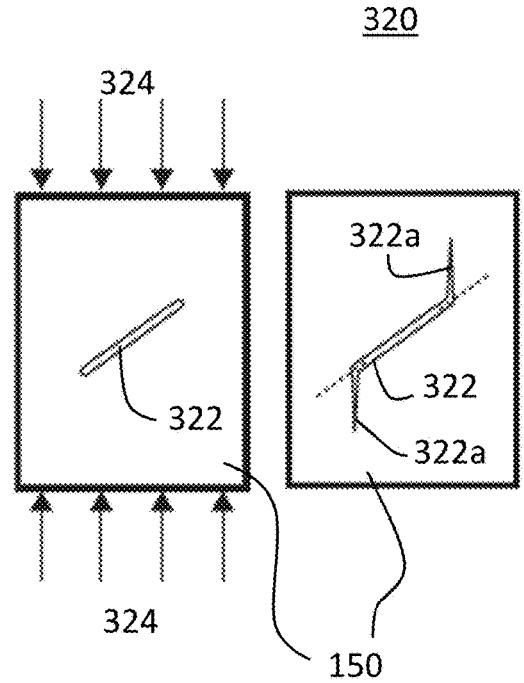

One of the simplest and most versatile tests to characterize rock strength is the point load strength test pioneered by Broch in 1972. See, E. Broch, J. Franklin, "The point-load strength test," International Journal of Rock Mechanics and Mining Sciences & Geomechanics Abstracts. Elsevier, 1972, Vol. 9, pp. 669-676) and described in ASTM D 5731-16 (see, D5731-16. Standard Test Method for Determination of the Point Load Strength Index of Rock and Application to Rock Strength Classifications. Standard, ASTM International, West Conshohocken, PA, 2016). This test is referred to as an index test as the compressive strength of the rock specimen which can have any shape, unlike other compressive strength tests which need the rock specimen to have nice cylindrical shape, is not directly measured from this test but what is measured is an index to which the compressive strength is proportional to. This index, denoted by Is, is given by:

$$I_s = \frac{P}{D^2} \quad (8)$$

where P is the load at which the rock sample, held in-between conical platens shown in FIG. 3A, fails or ruptures and D is the distance between the platens. The compressive strength of rock ($\sigma_c$) is then given by:

$$\sigma_c = k I_s \quad (9)$$

where k is a factor in between 17.5 and 24.5 which depends on the size of the rock sample, the manner of loading (diametrical or axial) and the shape of the rock sample (cylindrical core or spherical lump). This test is an experimental equivalent of the fill height independence study conducted by the inventors in a prior work in the field of metal additive manufacturing. See, Desai, P. S.; Mehta, A.; Dougherty, P. S.; Higgs, F. C. A rheometry based calibration of a first-order DEM model to generate virtual avatars of metal Additive Manufacturing (AM) powders. Powder Technology 545 2019, 342, 441-456. This standard test (see, D5731-16. Standard Test Method for Determination of the Point Load Strength Index of Rock and Application to Rock Strength Classifications. Standard, ASTM International, West Conshohocken, PA, 2016) provides information about the smallest feasible rock sample size which can provide dependable and reproducible strength values. Thus, this test is also best suited for calibrating a virtual avatar of the real rock, i.e., a virtual rock which has compressive strength equal to that of the real rock, as the virtual rock can have computationally manageable DEM micro-properties.

Virtual Point Load Strength Test: Axial Loading

As shown in FIG. 3A, two cones, having geometries as defined in the ASTM standard D 5731-16 are used to apply point axial loads on the top and bottom faces of the cylindrical rock core using displacement control (0.2 mm/s). See, D5731-16. Standard Test Method for Determination of the Point Load Strength Index of Rock and Application to Rock Strength Classifications. Standard, ASTM International, West Conshohocken, PA, 2016. The diameter of the virtual rock core is 36 mm and the height is 23 mm. Based on the ASTM standard D 5731-16, a sandstone like Castlegate having an unconfined compressive strength of 12 MPa should fail at a point load P of about 250N (assuming k to be 25). Note that this standard applies to rocks having compressive strength 15 MPa or more.

Figure 8B:
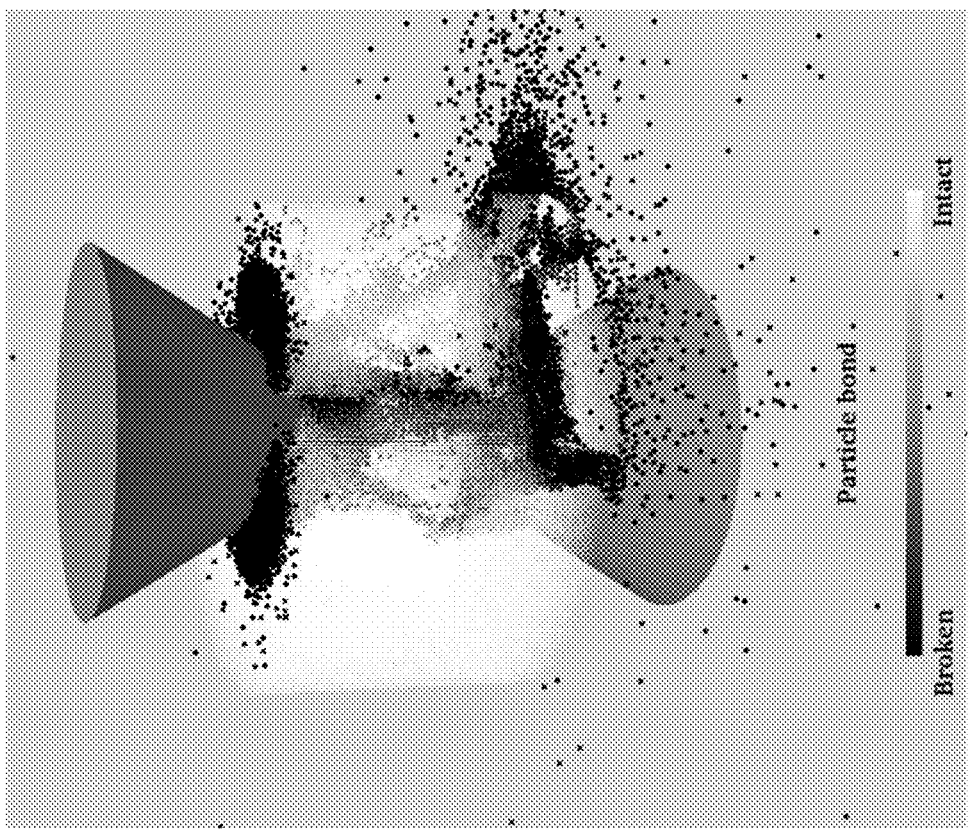
FIGS. 8A and 8B are typical simulation start time and end time snapshots in a point load test performed in accordance with a preferred embodiment of the present invention.
Figure 8A:
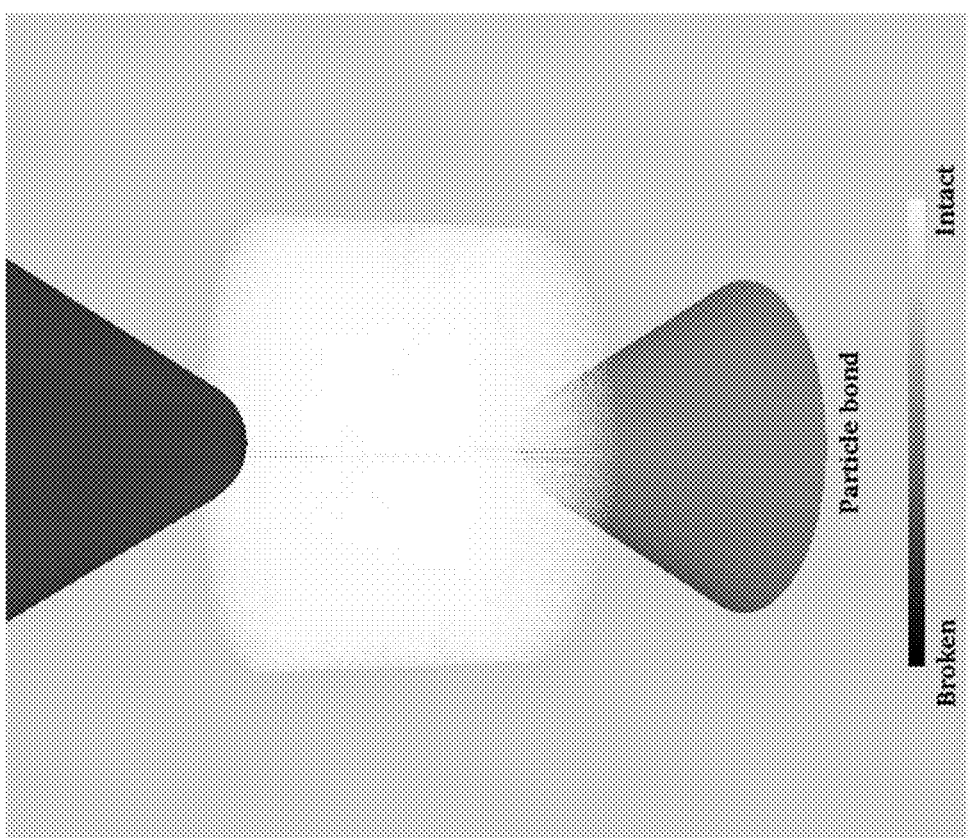
Figure 9:
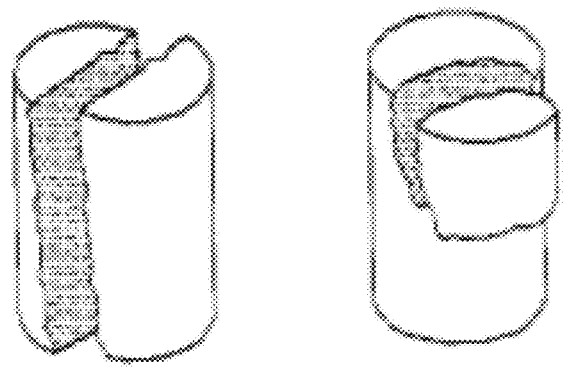
FIG. 9 illustrates valid and invalid failures in a point load test performed in accordance with a preferred embodiment of the present invention.

Typical simulation start time and end time snapshots are shown in FIGS. 8A and 8B. The concrete-like rock can be seen to be failing by developing a fault plane which intersects both the top and bottom faces of the rock. This type of failure is desired and described as a valid failure in ASTM standard D 5731-16 for this test. FIG. 9 illustrates valid and invalid failures. The rock failure occurred at a much lesser load of about 2N (i.e. a compressive strength of 95 kPa) for the DEM parameters given in Table 1.

TABLE 1

Contact interaction parameters used in bonded particle DEM rock drilling simulations

| Parameter | Value |
|---|---|
| Density of grains (kgm-3) | 2650 |
| Grain diameter (μm) | 500 |
| $V_{max}$(mm/s) | 20 |
| $\mu_{pp}$ | 0.3 |
| $\mu_{pv}$ | 0.9 |
| $\mu_{pd}$ | 0.3 |
| ε | 0.8 |
| λ | 20 |
| γ | 0.8 |

The failure load in the virtual point load test can be increased by increasing the values of $V_{max}$ and λ, however this will result in a smaller time step and longer simulation time. This virtual avatar, though not a naturally occurring rock, can still be thought of as a very weak concrete-like rock, which qualitatively fails like real rocks and can be used to study the drilling action.

Computational Fluid Dynamics

Fluid dynamics is numerically modeled using Eulerian principles which assume the fluid to be a continuum. Following momentum conservation (Eq. 10) and mass conservation (Eq. 11) equations are solved using finite differencing technique:

$$\rho\left(\frac{\partial V_x}{\partial t} + V_x\frac{\partial V_x}{\partial x} + V_y\frac{\partial V_x}{\partial y} + V_z\frac{\partial V_x}{\partial z}\right) = \quad (10a)$$
$$-\frac{\partial p}{\partial x} + \mu_f\left(\frac{\partial^2 V_x}{\partial x^2} + \frac{\partial^2 V_x}{\partial y^2} + \frac{\partial^2 V_x}{\partial z^2}\right) + \rho f_x$$

$$\rho\left(\frac{\partial V_y}{\partial t} + V_x\frac{\partial V_y}{\partial x} + V_y\frac{\partial V_y}{\partial y} + V_z\frac{\partial V_y}{\partial z}\right) = \quad (10b)$$
$$-\frac{\partial p}{\partial y} + \mu_f\left(\frac{\partial^2 V_y}{\partial x^2} + \frac{\partial^2 V_y}{\partial y^2} + \frac{\partial^2 V_y}{\partial z^2}\right) + \rho f_y$$

-continued $$\rho\left(\frac{\partial V_z}{\partial t} + V_x\frac{\partial V_z}{\partial x} + V_y\frac{\partial V_z}{\partial y} + V_z\frac{\partial V_z}{\partial z}\right) = \qquad(10c)$$

$$-\frac{\partial p}{\partial z} + \mu_f\left(\frac{\partial^2 V_z}{\partial x^2} + \frac{\partial^2 V_z}{\partial y^2} + \frac{\partial^2 V_z}{\partial z^2}\right) + \rho f_z$$

$$\frac{\partial V_x}{\partial x} + \frac{\partial V_y}{\partial y} + \frac{\partial V_z}{\partial z} = 0 \qquad(11)$$

Numerical solution to the above 3D, time-dependent, Navier-Stokes equations based on Chorin's projection method and staggered grid, is obtained using the techniques elaborated in M. Griebel, et al., "Numerical simulation in fluid dynamics: a practical introduction," SIAM, 1998. Fluid entrapment in sliding surfaces with converging gap results in pressure increases and should be accounted for while simulating the rock drilling problem. See, O. Reynolds, "On the Theory of Lubrication and Its Application to Mr. Beauchamp Tower's Experiments, Including an Experimental Determination of the Viscosity of Olive Oil," Proceedings of the Royal Society of London 1886, 40, 191-203. While trying to solve the fluid mechanics at the length scale where the aforementioned entrapment occurs, the size of the mesh or computational grid reduces to microns, while the length scale of the entire problem is in be in few cm's or m's. This necessitates a local mesh refinement to save on computational costs by not having to simulate the entire CFD domain with highly refined mesh elements. An implementation of a non-uniform mesh or a locally refined mesh, referred to as a graded mesh from hereon, mandates the changes in the discretization schemes elaborated by Griebel et al. for the uniform mesh. In the present invention, discretization schemes are used to account for a graded mesh similar to the one shown in FIGS. 10C and 13B. See, E. Sanmiguel-Rojas, et al., "Cartesian grid finite-difference method for 2D incompressible viscous flows in irregular geometries," Journal of Computational Physics 2005, 204, 302-318. The Immersed Boundary Method (IBM) is used to account for the fluid-solid interaction. See, C. S. Peskin, "The immersed boundary method," Acta numerica 2002, 11, 479-517 and P. Desai, "Tribosurface Interactions involving Particulate Media with DEM-calibrated Properties: Experiments and Modeling," PhD thesis, Carnegie Mellon University (2013). In this method, the presence of the solid inside the fluid is accounted for by applying a pseudo body force in the implementation of the Navier-Stokes equation. The advantages of this include the use of structured mesh which need not be body-fitted to the surface of the solid. The following two numerical examples, which serve as the validation for the CFD module of P-STAC, have been carried out:
 1. Air flow past stationary circular cylinder at low Reynolds numbers; and
 2. Hydrodynamic lubrication in fluid film bearing.

The aim of the first example below is to show the accuracy and computational efficiency of a CFD solver based on finite difference method of discretization, having structured-and-graded mesh, and employing IBM to account for immersed solids when compared to a CFD solver based on finite volume method of discretization and a body-fitted mesh. While the aim of the second example is to show the need to solve the entire 3D Navier-Stokes equations even for the problems involving lubrication, as in the case of the drill bit interacting with rocks in the presence of drilling fluid, instead of the lubrication approximation to the Navier-Stokes equation, also known as the Reynolds equation.

Air Flow Past Stationary Circular Cylinder

Figure 10A:
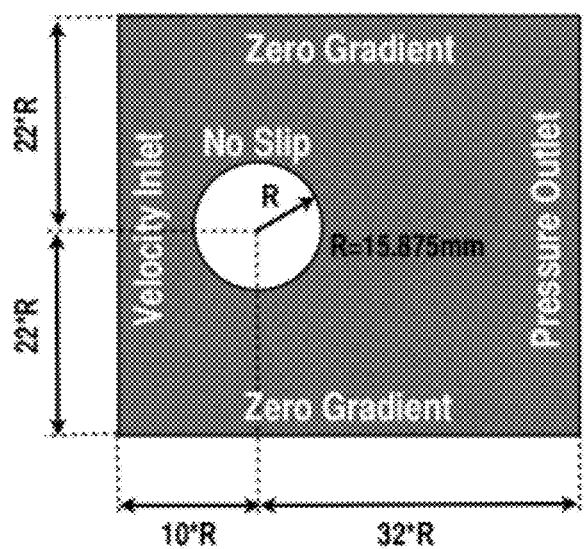
FIGS. 10A, 10B and 10C illustrate a CFD study of air flow past a stationary circular cylinder.
Figure 10B:
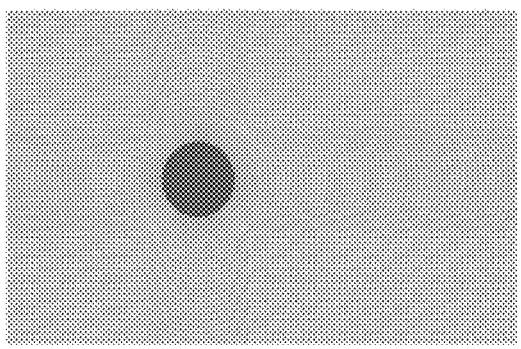
Figure 10C:
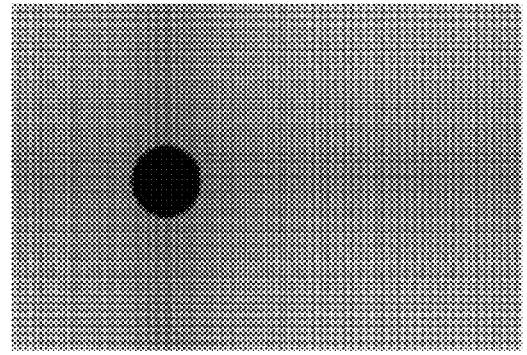

Flow past a stationary circular cylinder has been studied for many decades. Even today the simplicity of the problem setup, both experimentally and computationally, makes it a natural choice for a touchstone problem to validate and verify in-house software like P-STAC. Even though the setup is simple, the physics represented by this problem is quite complex and still remains a major research topic. The computational domain size and the boundary conditions used to simulate this fluid flow problem are shown in FIG. 10A. The body-fitted OpenFOAM mesh and the graded P-STAC mesh, which is refined in an exponential manner near the boundary of the circular cylinder are shown in FIG. 10A and FIG. 10C. The stationary circular cylinder is accounted for by the IBM in P-STAC simulation and by the body-fitted mesh in OpenFOAM simulation.

Figure 11A:
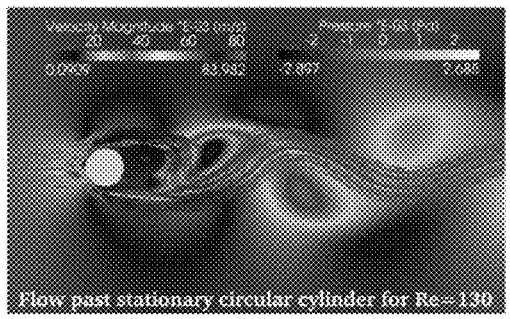
FIGS. 11A and 11B are P-STAC simulation snapshots showing the Karman vortex street formed behind the cylinder at time 1 (FIG. 11A) and time 2 (FIG. 11B.
Figure 11B:
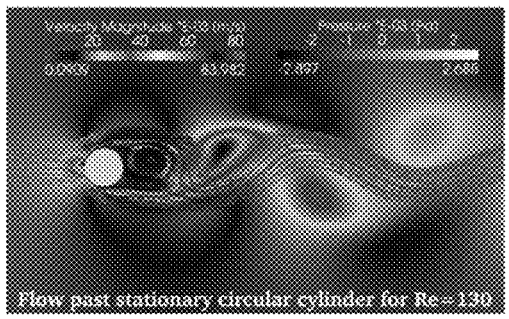

Unlike a flow past an obstacle having sharp corners, flow past a circular cylinder does not have pre-determined flow separation points. Also, the dynamics of Karman vortex street (as seen in FIGS. 11A and 11B) which depends on the Reynolds number, Re, which is the ratio of fluid inertial to viscous forces, adds to the complexity of this problem.

Figure 12A:
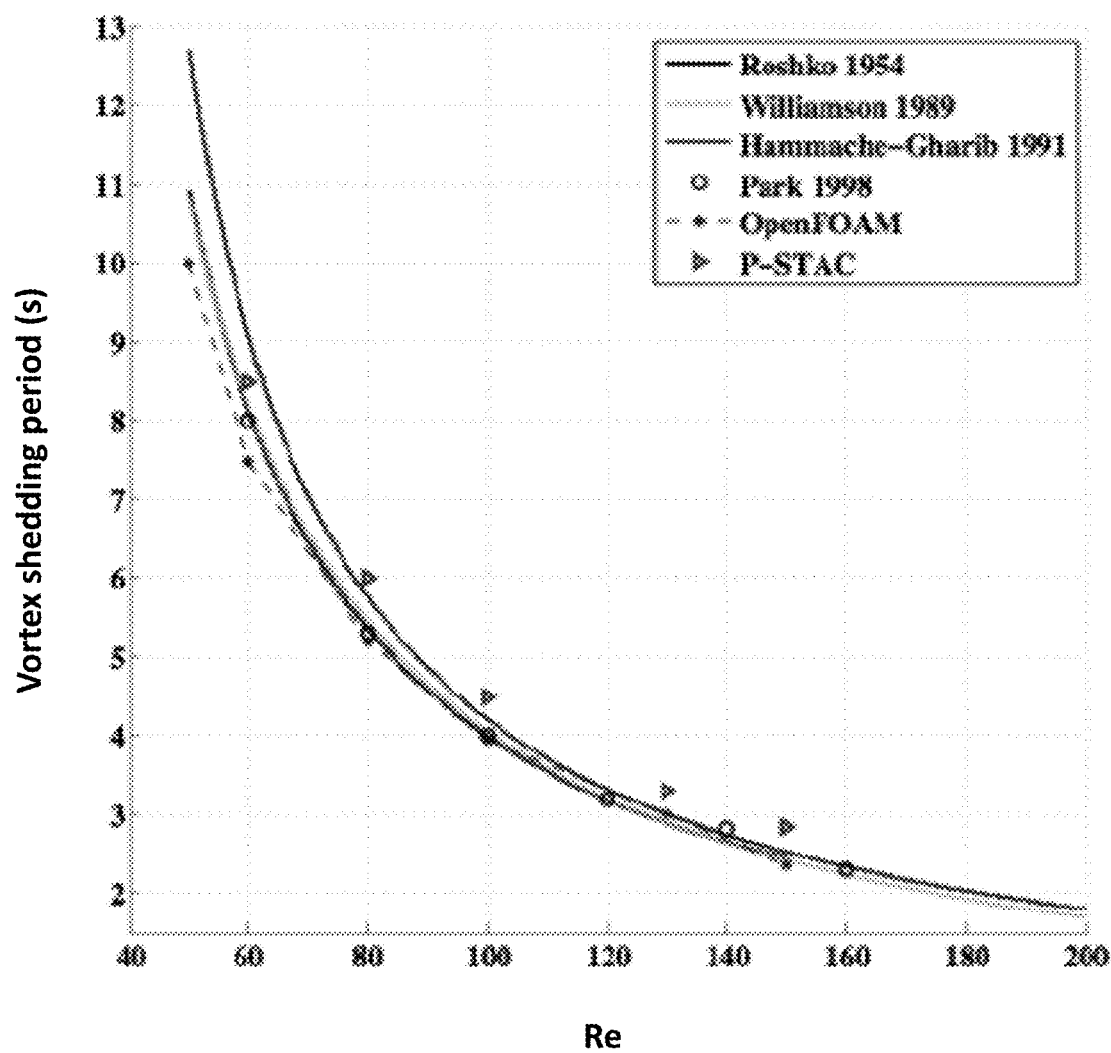
FIG. 12A is a graph of Time period of vortex shedding in a CFD study of air flow past a stationary circular cylinder.
Figure 12B:
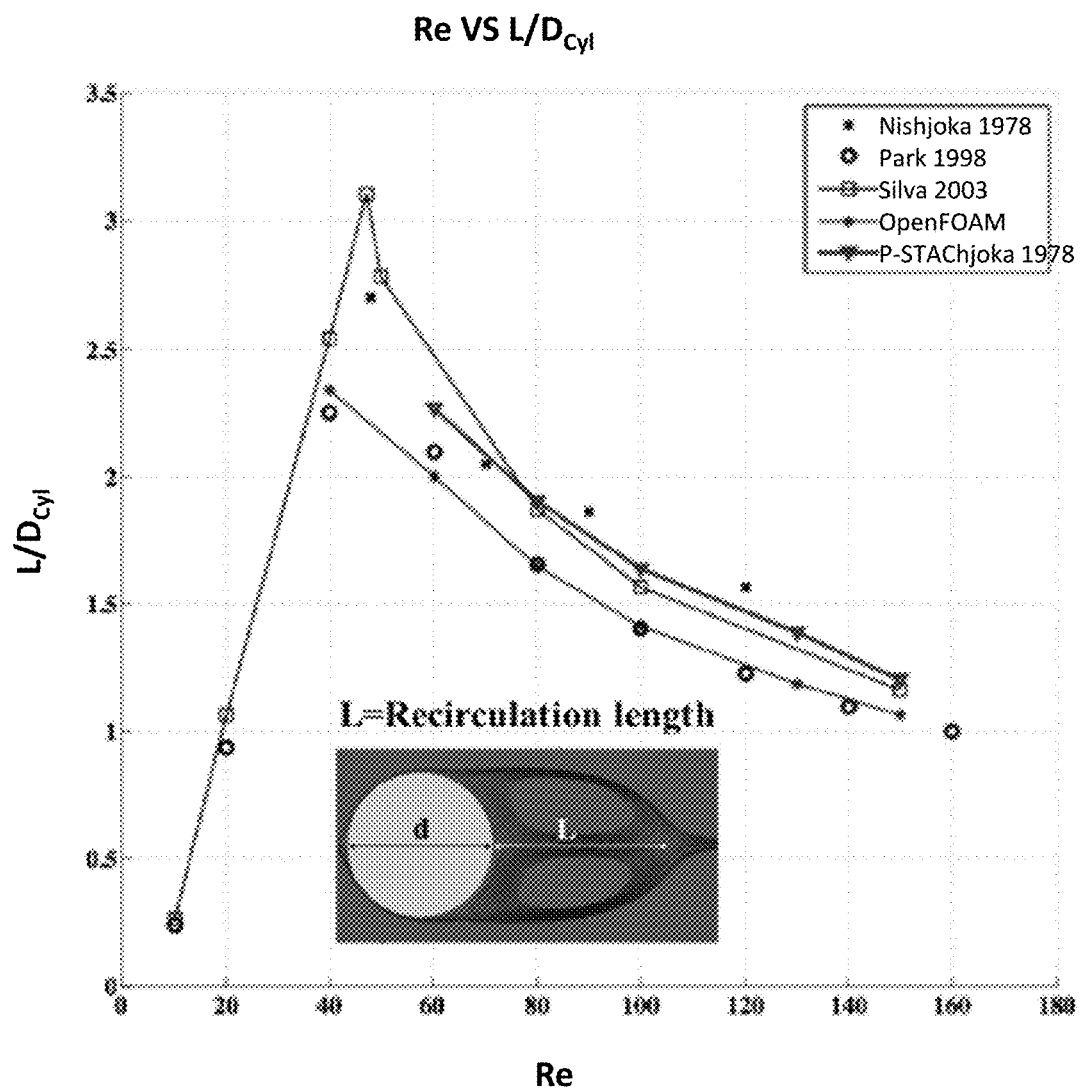
FIG. 12B is a graph of length of separation bubble in a CFD study of air flow past a stationary circular cylinder.

Time period of the vortex shedding is plotted in FIG. 12A. Vortices are shed faster as the Re increases. P-STAC results are in good agreement with OpenFOAM and other published numerical and experimental findings. See, A. Roshko, "On the drag and shedding frequency of two-dimensional bluff bodies 1954; M. Hammache and M. Gharib, "An experimental study of the parallel and oblique vortex shedding from circular cylinders," Journal of Fluid Mechanics 1991, 232, 567-590; C. Williamson, "Oblique and parallel modes of vortex shedding in the wake of a circular cylinder at low Reynolds numbers," Journal of Fluid Mechanics 1989, 206, 579-627; and J. Park, K. Kwon and H. Choi, "Numerical solutions of flow past a circular cylinder at Reynolds numbers up to 160," Journal of Mechanical Science and Technology 1998, 12, 1200-1205. Separation bubble length is defined as the distance from the base of cylinder (which is diametrically opposite to the flow stagnation point) to the point where the time-averaged velocity magnitude is zero (refer the schematic in the inset of FIG. 12B). The time averaging is carried out after the initiation of vortex shedding. The results are plotted in FIG. 12B. The results predicted by P-STAC are in good agreement with those predicted by OpenFOAM, the computational results by Park et al. and Silva et al. (A.L.E. Silva A. Silveira-Neto, J. Damasceno, "Numerical simulation of two-dimensional flows over a circular cylinder using the immersed boundary method. Journal of Computational Physics 2003, 189, 351-370) and experimental findings by Nishioka, et al. (M. Nishioka, H. Sato, "Mechanism of determination of the shedding frequency of vortices behind a cylinder at low Reynolds numbers, Journal of Fluid Mechanics 1978, 89, 49-60.

Hydrodynamic Lubrication with SAE 0W-40 Oil

Traditionally, Reynolds lubrication equation has been used to study hydrodynamic lubrication. See, J. Williams, "Engineering tribology," Cambridge University Press, 2005. Reynolds equation approximates the Navier-Stokes equations where inertial forces are assumed to be negligible (for low Re cases) and is useful as it is computationally must faster than a full CFD analysis. However, for the problem of drilling into rocks, the Reynolds number can get quite high and thus, the inertial terms of the Navier-Stokes equations must be considered. See, F. Sahlin, S. B. Glavatskih, T. Almqvis and R. Larsson, "Two-dimensional CFD-analysis of micro-patterned surfaces in hydrodynamic lubrication," Journal of tribology 2005, 127, 96-102. To show the dependence of the pressure generated in sliding contact with a converging gap, on increasing sliding speeds, a typical fluid film bearing is modeled as a flat surface with a semicircular bump (top surface in FIG. 13A). The computational domain size and the boundary conditions are shown in FIG. 13A and the graded mesh is shown in FIG. 13B.

Figure 13A:
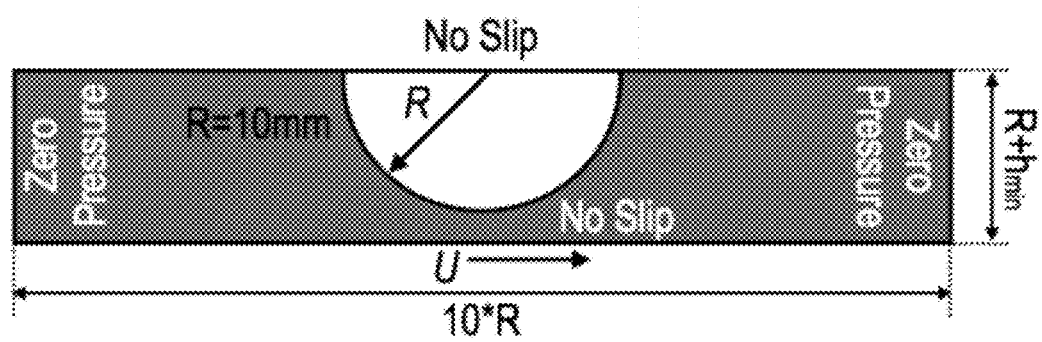
FIGS. 13A and 13B illustrate computational domain and boundary conditions and P-STAC mesh, respectively, in a CFD study of hydrodynamic lubrication in a fluid film bearing.
Figure 13B:
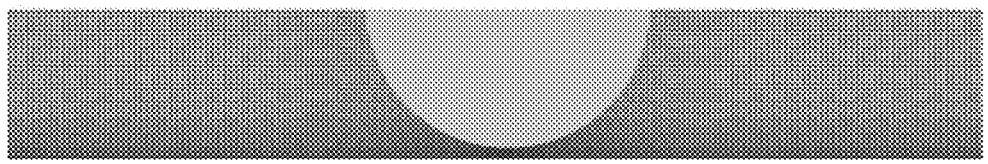
Figure 14:
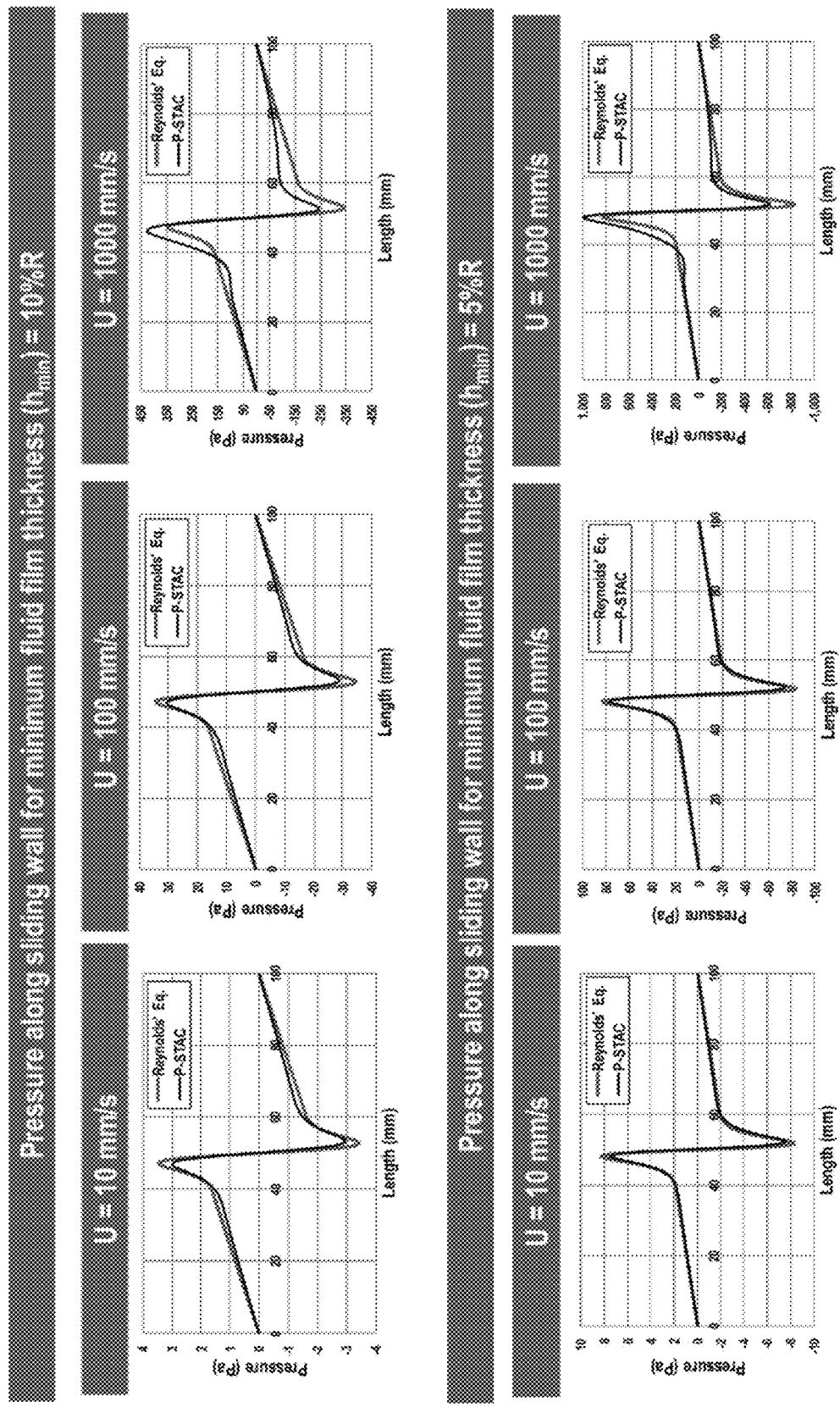
FIG. 14 illustrates results of a CFD study of hydrodynamic lubrication in a fluid film bearing.

Whenever fluid gets dragged in a converging gap, as in the case of the typical fluid film bearing in FIGS. 13A and 13B, a high-pressure zone is developed in the converging gap of the fluid film. This pressure results in the separation of the tribosurfaces. The pressure predicted by P-STAC is compared to the one predicted by Reynolds equation for two film thicknesses and varying speeds of the sliding wall in FIG. 14. As the film thickness decreases, the pressure generated in the tribosystem increases. This trend is predicted by both P-STAC and Reynolds equation (which is the simplification of CFD in P-STAC). However, as the speed of sliding wall increases, Reynolds equation under predicts the increase in pressure. At high speeds, often encountered in rock drilling, inertial terms which are neglected in Reynolds equation become important. Hence it is necessary to solve full CFD to predict the response of the drilling fluid in the problem of rock excavation for oil and gas recovery.

The CFD model introduced in this section can be used only for Newtonian fluids. Cavitation phenomenon has not been accounted for so negative pressures, if any in sliding contacts, must be neglected while trying to find the pressure force exerted on the tribosurfaces because of the presence of the fluids, akin to the half Sommerfeld solution to Reynolds equation. See, Williams, J. Engineering tribology; Cambridge University Press, 2005.

Drilling into Sandstone

Sandstone, a type of sedimentary rock, is one of the most commonly excavated rock lithology for the recovery of oil and gas. See, R. E. Goodman, "Introduction to rock mechanics," Vol. 2, Wiley New York, 1989. Sandstone rocks are formed by the compaction of the inorganic sediments and their cementation due to the organic matter over many years. See, Jin, et al., "Physics-based reconstruction of sedimentary rocks," SPE Western Regional/AAPG Pacific Section Joint Meeting, Society of Petroleum Engineers, 2003. The cementitious material which is usually organic in nature, gets decomposed over the years into oil and gas. Also, the porous nature of these rocks serves as a natural trap for oil and gas. Thus, sedimentary sandstone cores have been used in this example.

Experiments

Figure 4A:
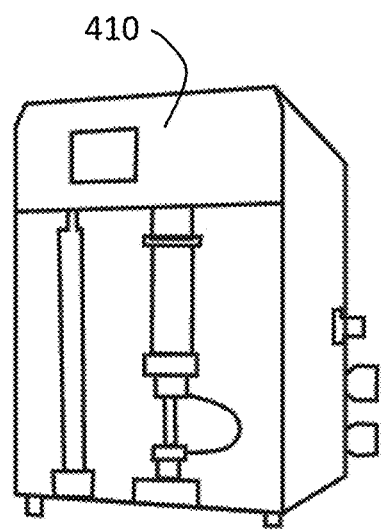
FIG. 4A illustrates a benchtop experimental rock drill apparatus used in connection with preferred embodiments of the present invention.
Figures 4B, 4C:
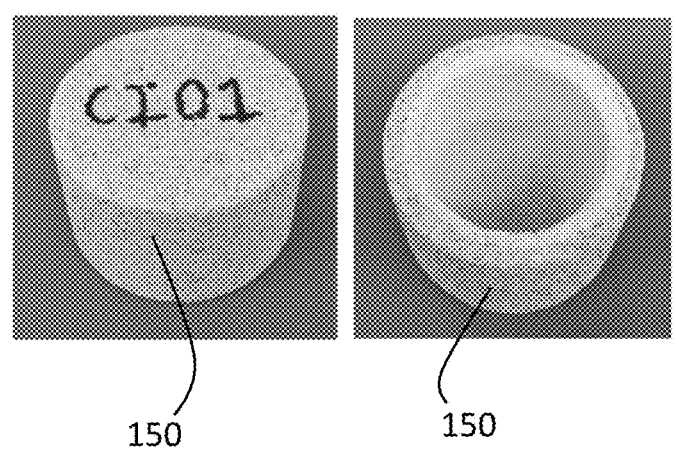
FIGS. 4B and 4C are images of a sample rock before and after benchtop experimental drilling in accordance with a preferred embodiment of the present invention.

An experimental benchtop drilling simulator as shown in FIG. 4A was used in this experiment to conduct tests on two types of Sandstone cores-Castlegate sandstone (compressive strength of 15 MPa) from the energy rich state of Texas and Crab Orchard sandstone (compressive strength of 170 MPa) from Tennessee. The core size is 1.5 inch in diameter and 1 inch in length. Sample pre-test and post-test sandstone cores are shown in FIGS. 4B and 4C.

Three drilling tests were conducted on the Castlegate cores using the drilling simulator shown in FIG. 4A. The first two tests involved a weight on bit (WoB) of about 275N and the drill bit rotated at 300 rpm while the third test was performed at a lower WoB of about 137.5N. The purpose of the first two tests (which was the same test conducted twice) was to check the repeatability of the drilling behavior on this benchtop drilling simulator while the last one was conducted to check the effect of WoB on the drilling rate or rate of penetration (RoP).

Two drilling tests were conducted on Crab Orchard cores using the drilling simulator. First one was under dry conditions and the second one was under wet conditions with water as the drilling fluid. For the wet case, the rock core was soaked in water for 24 hours prior to the test. Since this sandstone is much stronger than the Castlegate sandstone, the WoB was kept relatively higher at 695N with 200 rpm, for both the tests on the Crab Orchard cores.

Modeling

Physics-Based Modeling

Figure 5:
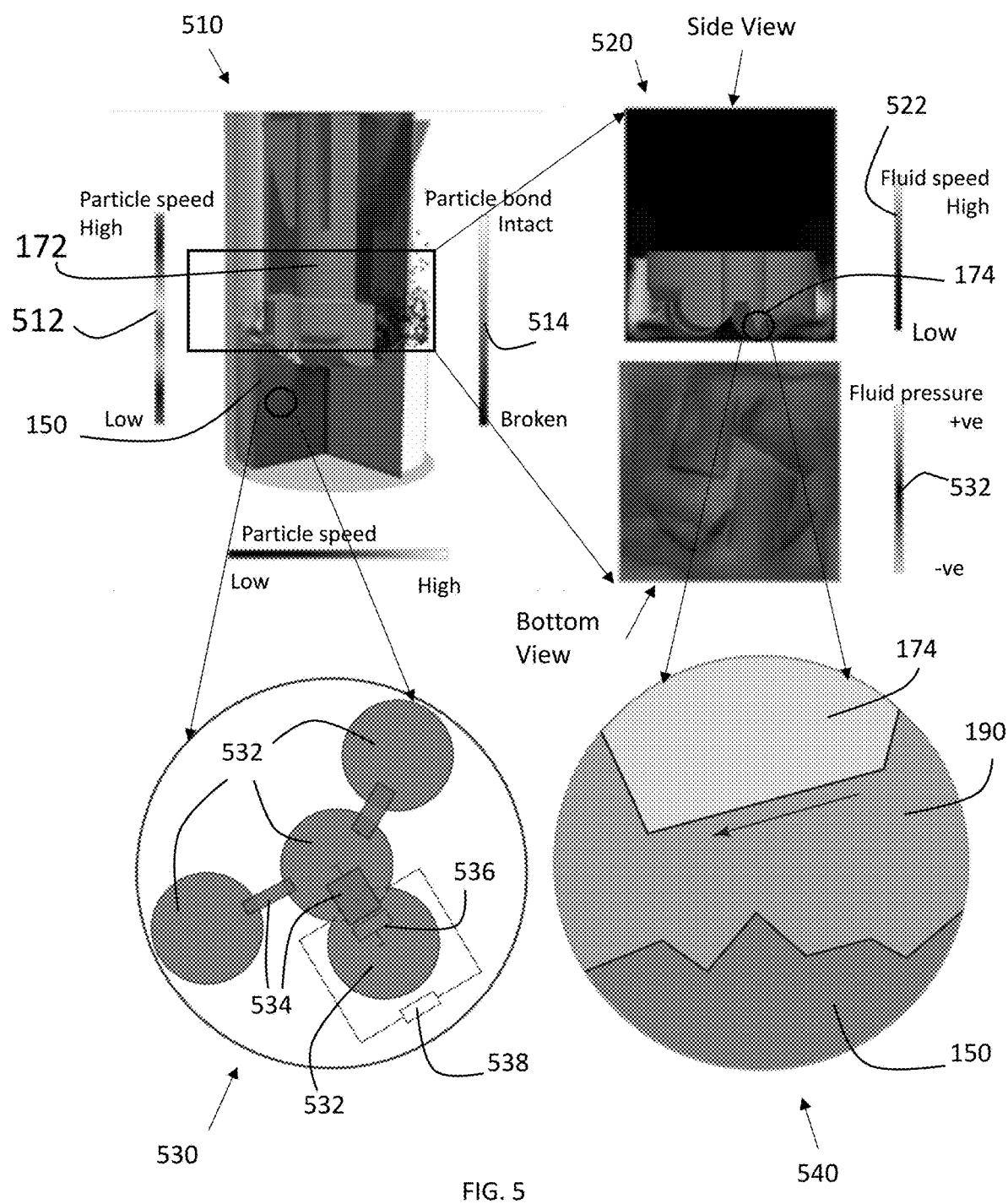
FIG. 5 illustrates a virtual drilling process in accordance with a preferred embodiment of the present invention.

P-STAC was used to simulate the dry and wet drilling on the weak concrete-like rock. Relatively low weight on bit of 0.5N to 2.5N was used in these simulations. For the wet drilling case a standalone CFD simulation was carried out to figure out the hydrodynamic pressure generated against a flat surface separated by a fluid film of the size of a single sandstone grain (i.e., 500 µm), shown in the inset of "Lubrication model: Immersed solid+CFD" in the lower right corner of FIG. 5. Sample P-STAC simulation snapshot for wet drilling is shown in FIG. 5. The positive pressure generated on the bottom flat surface is integrated over the flat area to find the upward force acting on the drill bit. This force is subtracted from the total WoB to get effective WoB, denoted by $WoB_{\mathit{eff}}$ and a full-scale bonded particle DEM-CFD simulation is carried out. The full scale CFD result has been simulated using a coarser mesh and does not affect the drilled rock cuttings, thus the one-way coupled nature of these simulations. The Cartesian domain used for the CFD was such that it circumscribed the cylindrical rock specimen. The boundary conditions for the CFD were no slip on all the walls, including the immersed boundary of the drill bit, except the top wall where it was zero pressure.

Each drilling simulation consisted of 265,000 spherical DEM particles and was GPU parallelized using CUDA. One dry drilling simulation required 1 hr and 30 mins to run on an nVIDIA GTX 1070 while the wet drilling simulation took 2 hrs, where the CFD was run on an Intel Xeon processor (3.7 GHz) in serial. The simulations for the dry drilling cases did not simulate the fluid dynamics.

Wear Modeling

Cutter wear is an important parameter to judge the life of the drill bit. Bit wear is the sum of wear of all the cutters on the drill bit. Proportional cutter wear volume per unit depth of drilling, $V_{w,cutter}$ can be described by the following simplified proportionality equation.

$$V_{w,cutter} \propto \frac{WoB_{\mathit{eff}} * X * H_{rack} * \tan(\gamma)}{H_{cutter}} \tag{12}$$

where X is the distance drilled (note: distance drilled is not the same as depth drilled, it is the entire length along which the cutter eroded the rock), H is the hardness and $\gamma$ is the angle of cutter with respect to the horizontal plane. See, R. K. Abbas, "A review on the wear of oil drill bits (conventional and the state of the art approaches for wear reduction and quantification)," Engineering Failure Analysis 2018, 90, 554-584. X for unit depth of drilling can be given by the following equation $$X = \frac{\omega * R}{RoP} \tag{13}$$

Here, $\omega$ is the rotational speed of the drill bit and R is the radial location of the cutter on the drill bit.

Finally, the wear of the entire bit can be obtained by summing up the wear of individual cutters:

$$V_{w,bit} \propto \sum_{i=1}^{i_{max}} V_{w,cutter}, \qquad (14)$$

For ranking drill bit having cutters made of similar material, drilling into similar rock and placed at constant R but at different angles, $H_{rock}$, $H_{cutter}$ and ω can be merged into the proportionality constant without losing any information. This bit wear is what is reported below.

5.2.2. Machine Learning Enabled Surrogate Modeling

The multiphysics model described above is computationally expensive and needs significant computational resources. On an average, a single run of the multiphysics model using nVIDIA GTX 1070 GPU and Intel Xeon processor requires 2 hours. It is not feasible to perform a design optimization using the multiphysics model alone. Thus, machine learning was used to develop a faster surrogate model of this multiphysics model. This surrogate model can be used to traverse the entire design space of the drill bit, here the angles of inner and outer cutters on the drill bit, in a speedy way.

The method to develop a surrogate of the multiphysics model requires one to run a Design of Simulations (DoS) by coarsely sampling the drill bit design space. The surrogate model in the present study is a Back Propagation Neural Network (BP-NN). The DoS carried out is shown in Table 2.

TABLE 2

Design of Simulations (DoS) for virtual drilling in aqueous conditions

| Parameter | Range of values |
| --- | --- |
| Rock Lithology | Crab Orchard sandstone |
| Drilling Fluid | Water |
| WoB | 2.5N |
| Bit rotational speed, ω, (rpm) | 200 |
| Number of outer cutters | 2 |
| Number of inner cutters | 2 |
| Angle of outer cutters, α, (°) | 0, 6, 12, 18 |
| Angle of inner cutters, β, (°) | 0, 6, 12, 18 |

The topology of the BP-NN is as shown in Table 3.

TABLE 3

BP-NN parameters for spreading simulations over a particular substrate

| Parameter | Value |
| --- | --- |
| Number of training samples | 12 |
| Number of test samples | 4 |
| Number of hidden layers | 1 |
| Number of hidden nodes | 1000 |
| Activation function for hidden layer | Sigmoid |
| Activation function for output layer | Linear |
| Learning rate α | 0.001 |
| L2-regularization parameter λ | 0.001 |

Results and Discussion

Drilling into Castlegate Sandstone: Dry Conditions

Figure 15A:
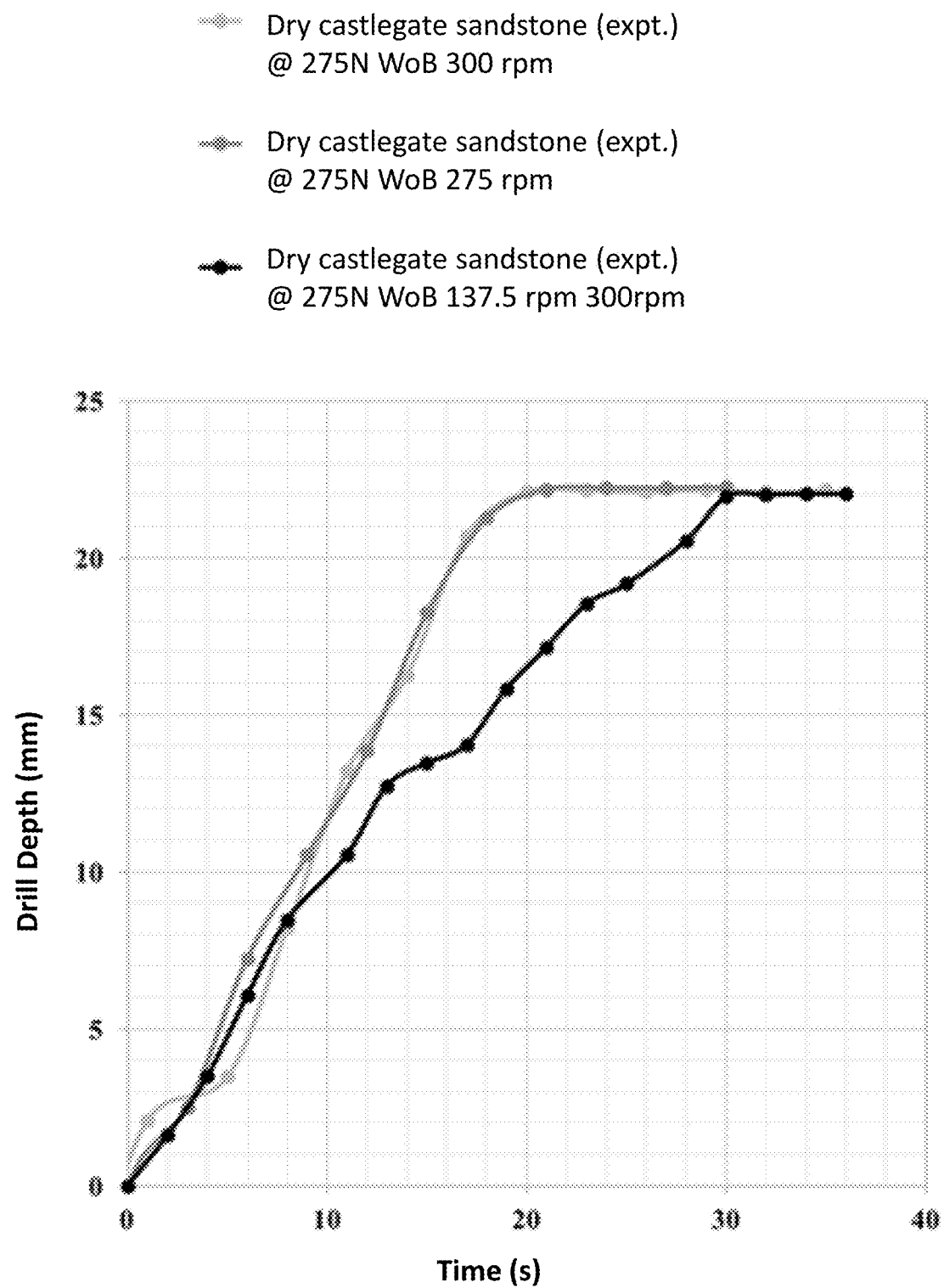
FIG. 15A is a graph of experimental drilling into Castlegate sandstone under dry conditions

The parameters for the three drilling tests which were conducted on the Castlegate sandstone cores have been stated above. The drill depth as a function of time for these three experimental tests is shown in FIG. 15A. The data for the first two tests is almost identical indicating the reproducibility of data using the benchtop drilling simulator. Also, it can be seen from the curves of FIG. 15A that as the WoB decreased by 50%, the time required to drill to the same depth increased by about 50%. Slope of the drill depth vs. drill time curve gives the rate of penetration (RoP). As the WoB decreased, the drilling behavior also changed from being a smooth drilling action, indicated by the smooth yellow and orange curves in FIG. 15A, to a more erratic action which is indicated by the jagged black curve in FIG. 15A. This erratic behavior is akin to the bit bounce experienced in the real drilling conditions.

Figure 15B:
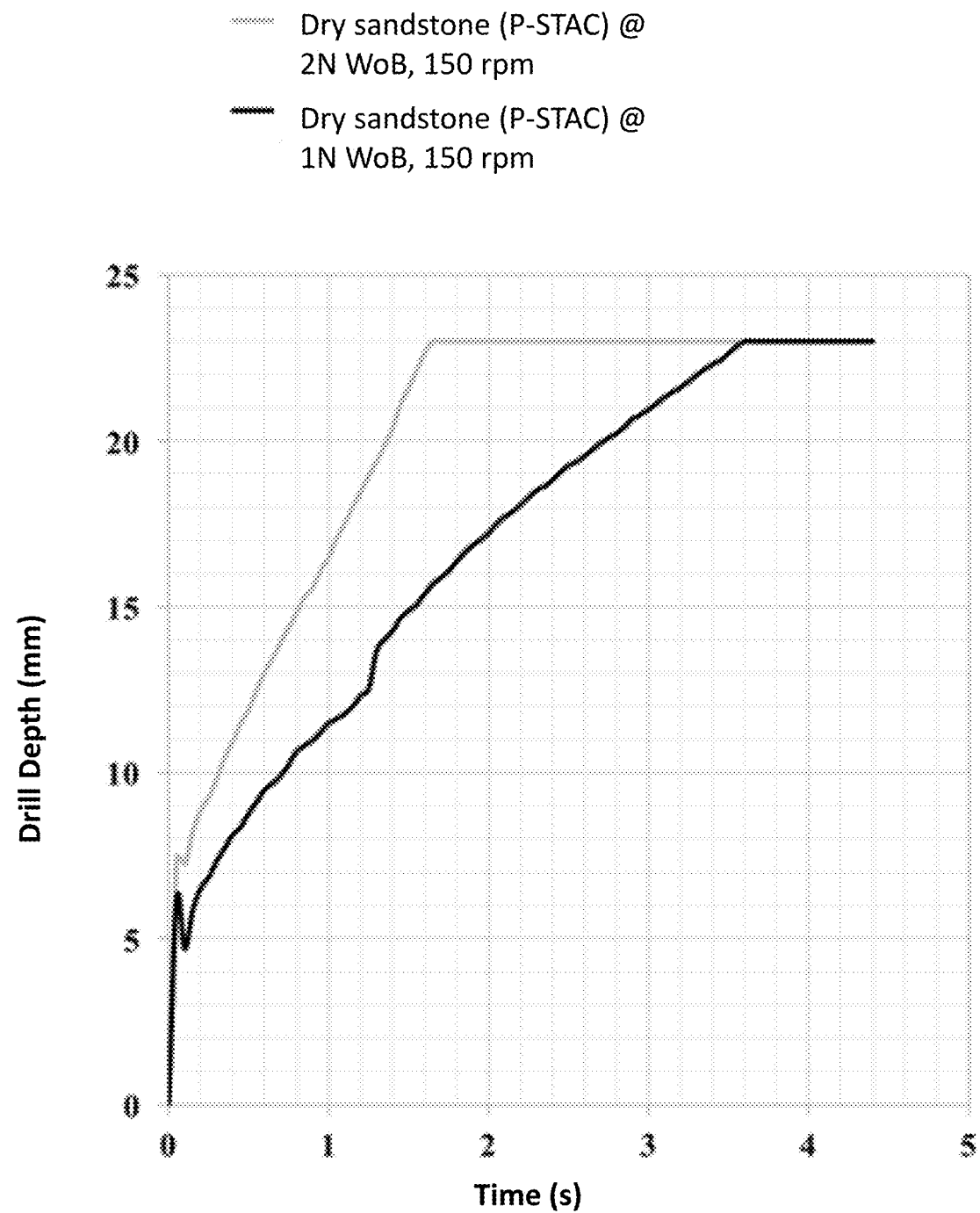
FIG. 15B is a graph of virtual drilling with P-STAC into Castlegate sandstone under dry conditions.

P-STAC simulations were carried out on the weak concrete-like rock at much lower WoB of 2N and 1N. Drill depth as a function of time for the P-STAC simulations is shown in FIG. 15B. The simulation results show that the drilling time increases as the WoB decreases. This finding is in qualitative agreement with the experimental results which are shown in FIG. 15A. The lower WoB P-STAC simulation is also able to capture the bit bounce as was seen in the experimental results.

Drilling into Crab Orchard Sandstone: Dry and Aqueous Conditions

Figure 16A:
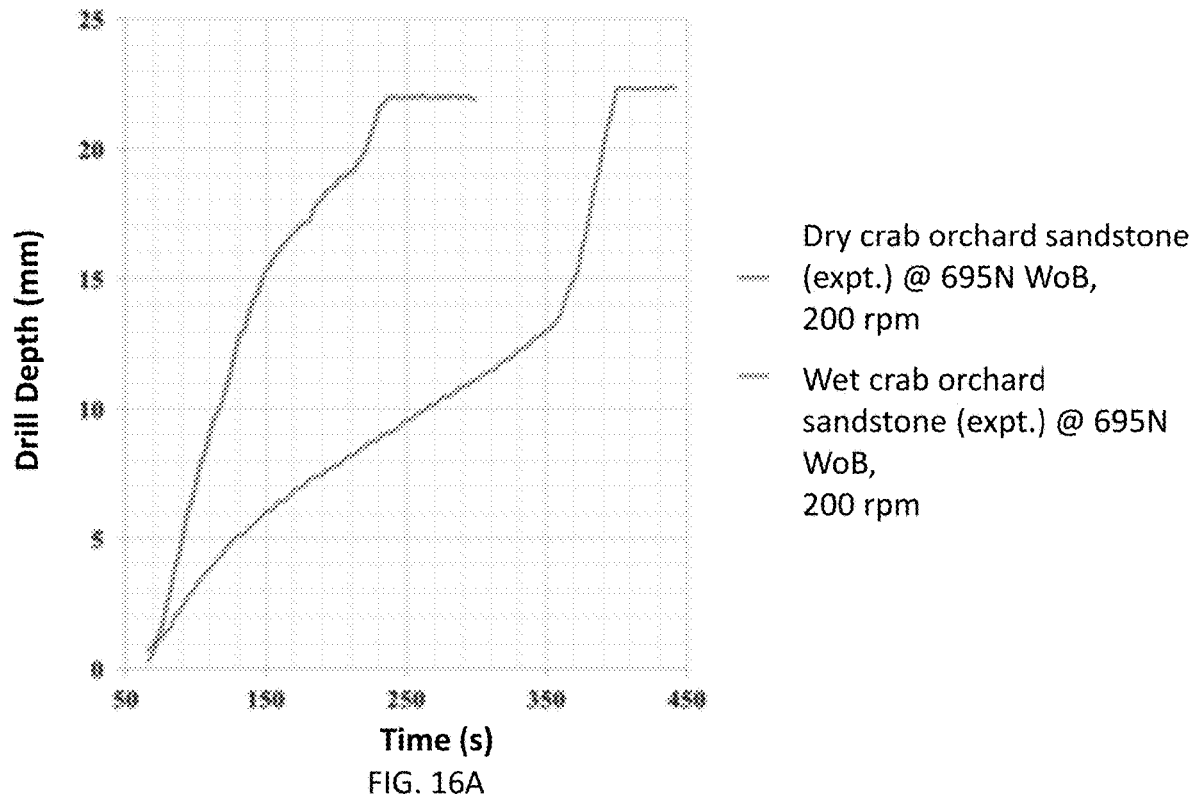
FIG. 16A is a graph of experimental drilling into Crab Stone sandstone under dry and aqueous or lubricated or wet conditions

The parameters and sample preparation for the two drilling tests which were conducted on the Crab Orchard sandstone cores have been stated above. The only difference between the two tests was that one was under dry conditions and the other was in aqueous conditions. The drill depth as a function of time for these two experimental tests is shown in FIG. 16A. For the aqueous or wet case, the drill bit took significantly longer time to penetrate to the same depth as compared to the dry case. This could have been due to the lubrication caused by the water. The sudden jump towards the end of these curves might be due to the failure, via a longitudinal crack along the side from top to bottom, of the rock samples (FIG. 4B shows an intact post-test sample). It might be useful to investigate drilling in these sandstone cores at a lower WoB.

Figure 16B:
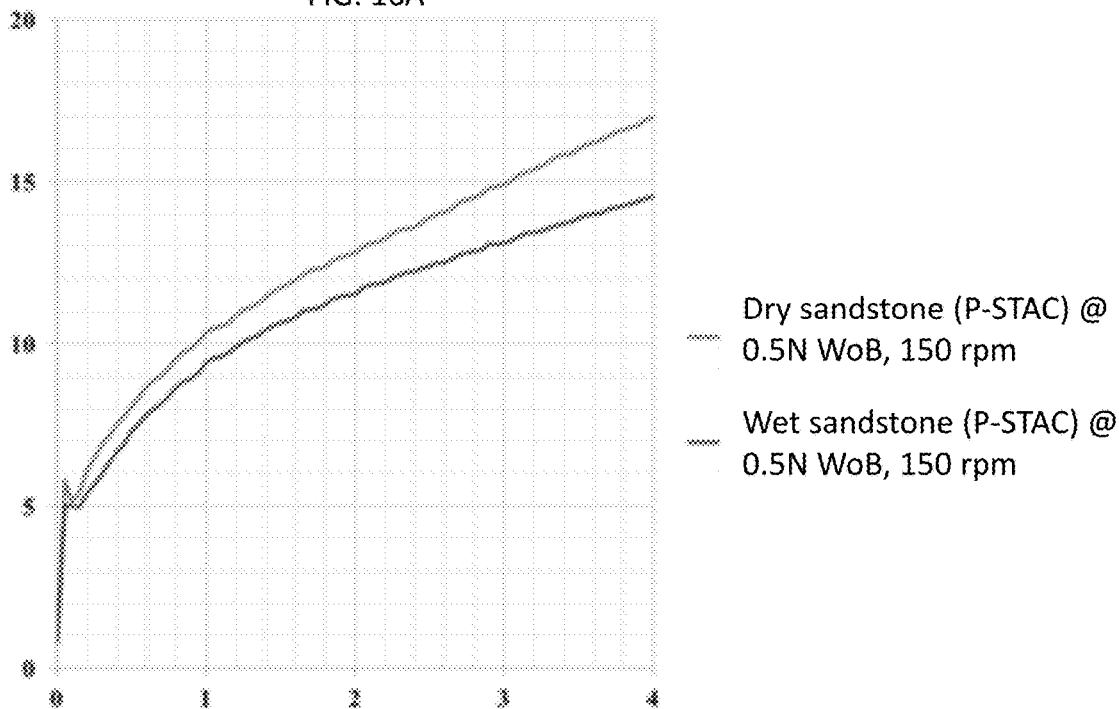
FIG. 16B is a graph of virtual drilling with P-STAC into Crab Stone sandstone under dry and aqueous or lubricated or wet conditions.

P-STAC simulations were carried out on the weak concrete-like rock at much lower WoB of 0.5N under dry and wet conditions. The standalone CFD simulation to determine the hydrodynamic lubrication (see FIG. 5, upper right) resulted in an upward or lubrication force of about 0.5N for drill bit rotating at 150 rpm. This force was subtracted from the total WoB. This force will be a lot higher if the actual, computationally expensive, drill bit-rock interface were to be simulated at higher rpm. Drill depth as a function of time for the P-STAC simulations is shown in FIG. 16B. It takes longer time to drill in the aqueous conditions than in the dry conditions. This finding is in qualitative agreement with the experimental results which are shown in FIG. 16A.

Drill Bit Design Chart

Figure 17A:
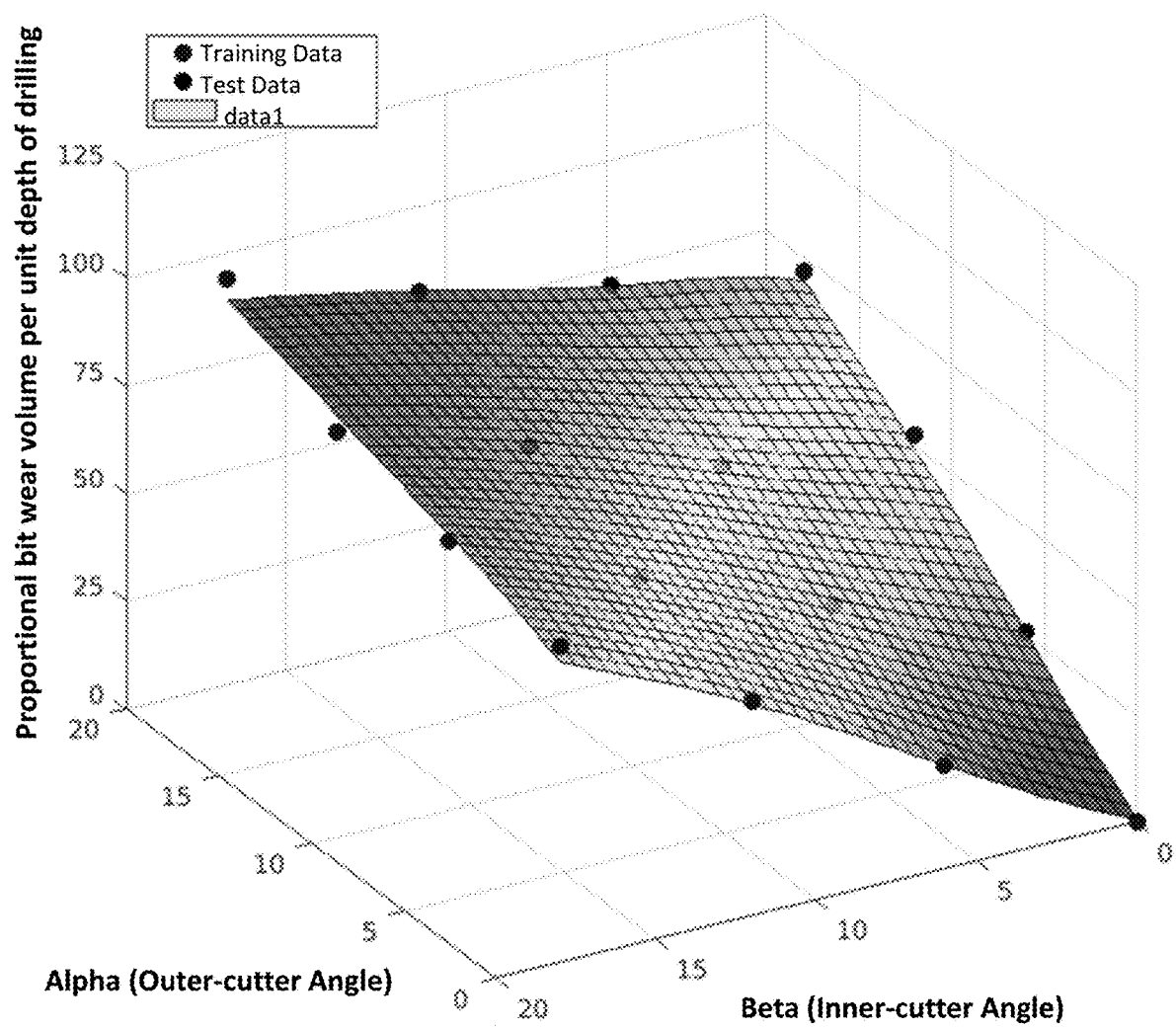
FIGS. 17A, 17B and 17C are graphs of the output of ML enabled surrogate model of P-STAC for bit wear for the case of drilling into weak Crab Orchard like sandstone with water as the drilling fluid.
Figure 17B:
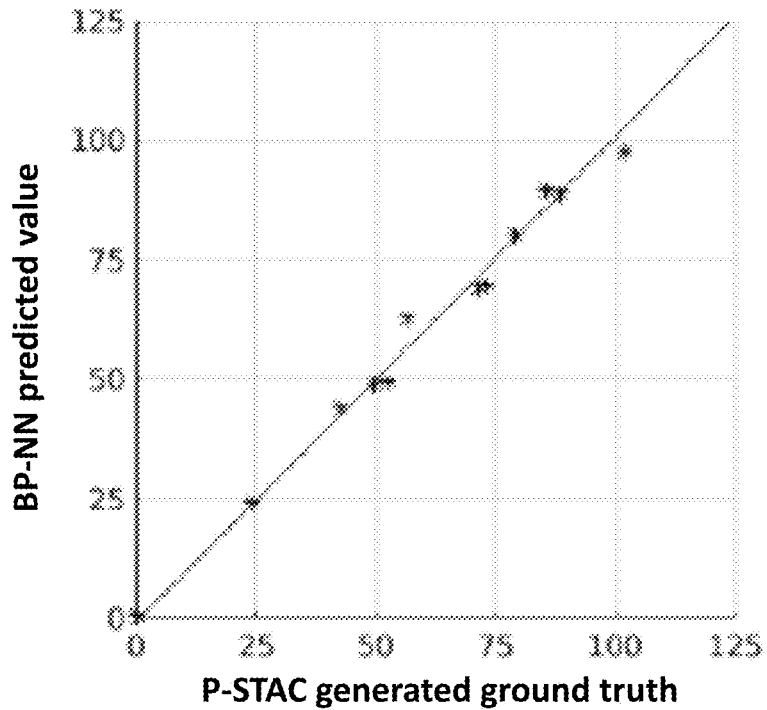
Figure 17C:
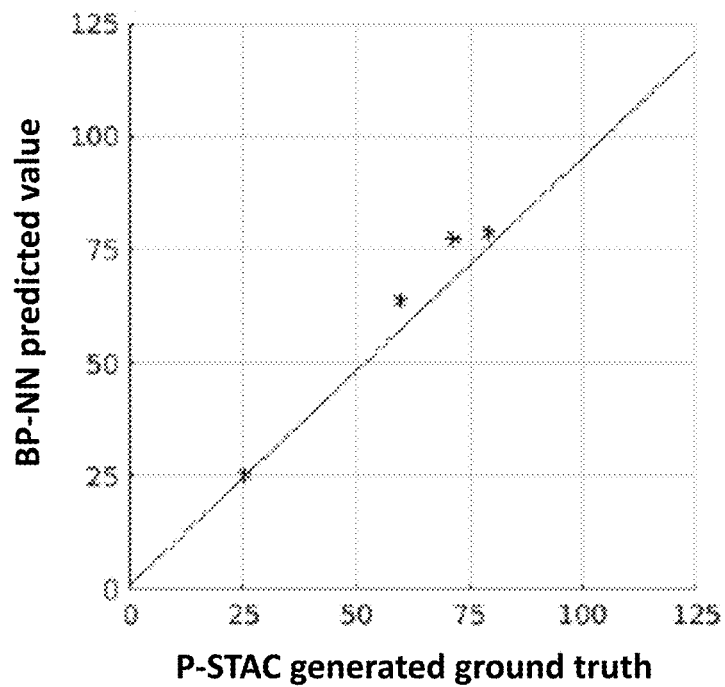
Figure 18A:
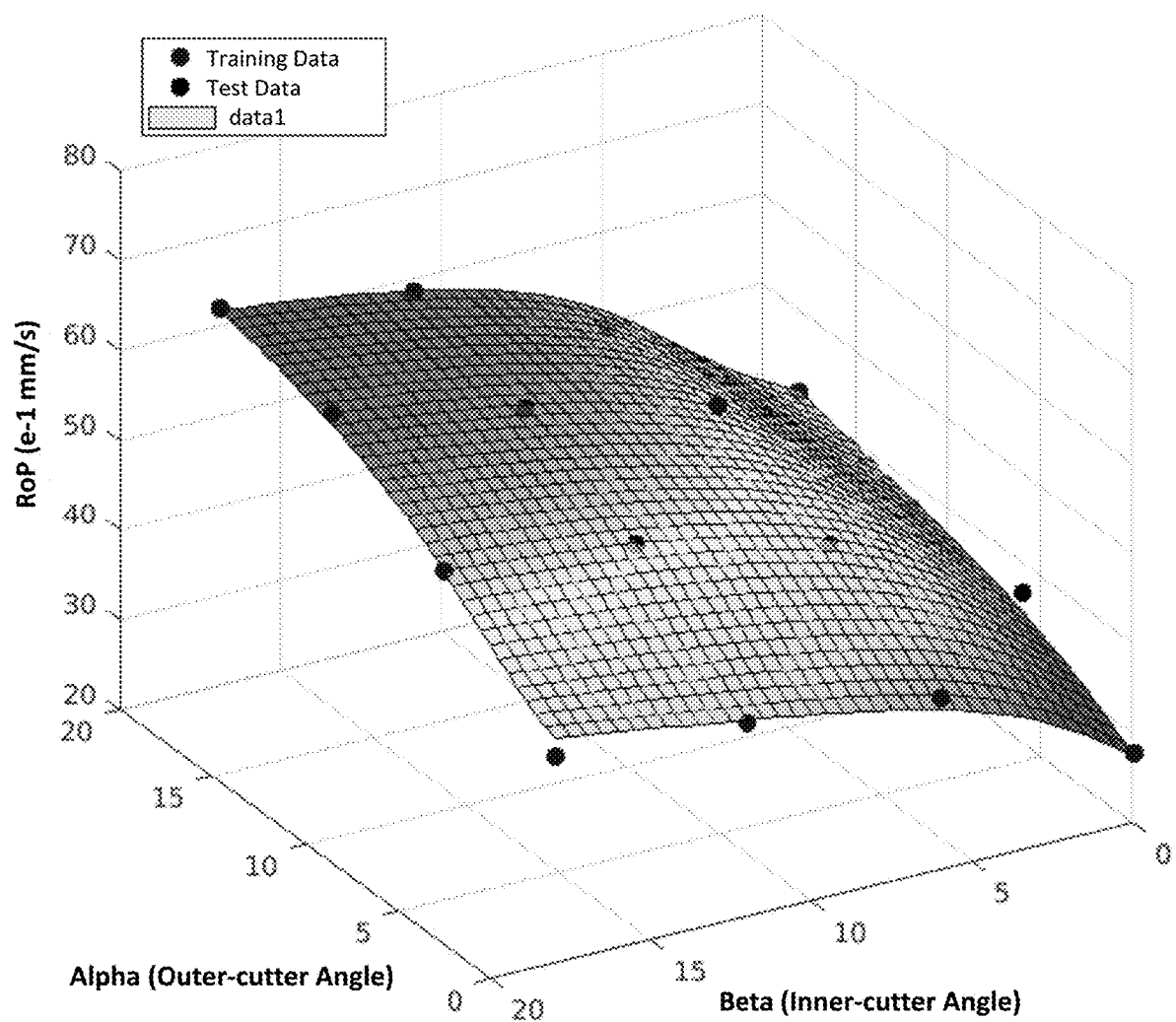
FIGS. 18A, 18B and 18C are graphs of the output of ML enabled surrogate model of P-STAC for RoP for the case of drilling into weak concrete-like sandstone with water as the drilling fluid.
Figure 18B:
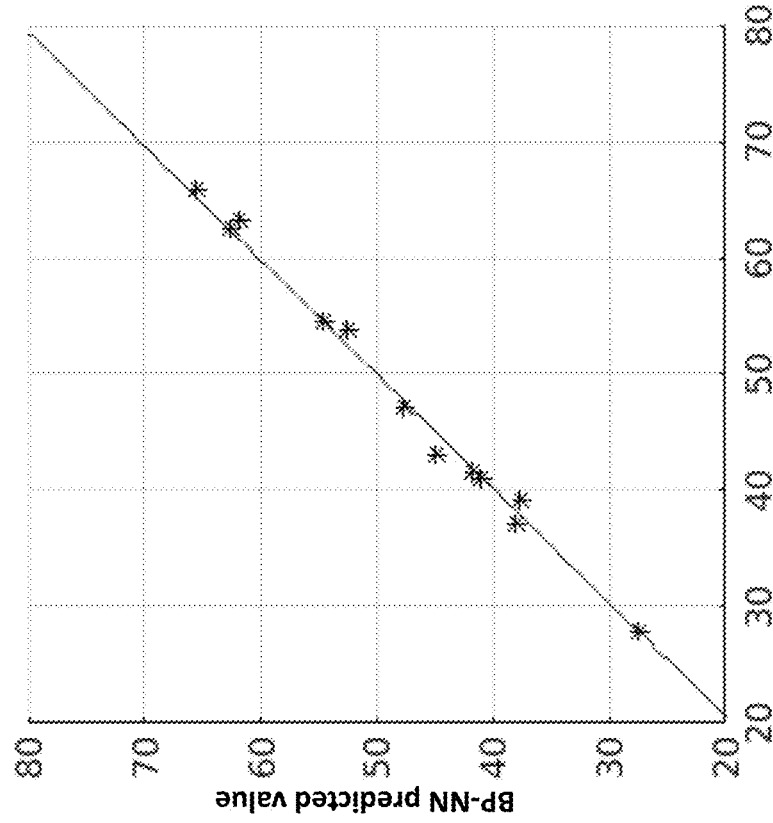
Figure 18C:
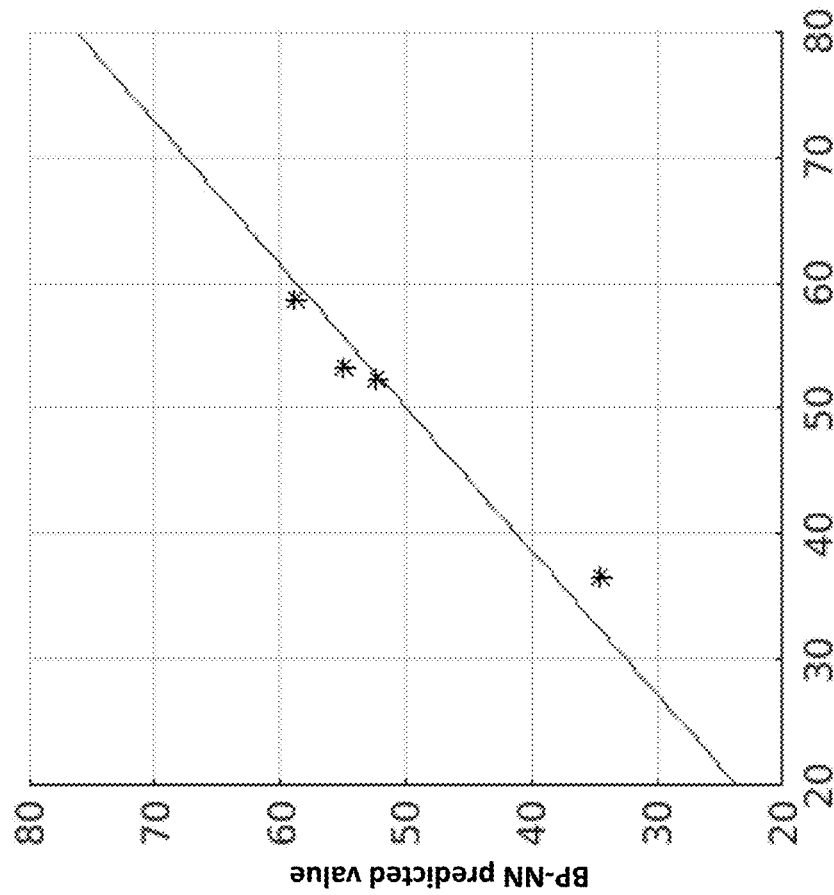

The experimentally verified multiphysics rock drilling model can now be used to optimize drill bit shape for a particular rock lithology. P-STAC was run for the DoS detailed in Table 2 which coarsely samples the drill bit design shape. The inputs of cutter angles and outputs from P-STAC of bit wear and RoP serve as the data for the surrogate model of BP-NN detailed in Table 3. FIGS. 17A-C and 18A-C show the performance and output of the ML surrogate model. The regressed surface plots are shown in FIGS. 17A and 18A. The non-linear dependence of wear of bit and RoP on the cutter angles is obvious from these figures. This warrants the use of a BP-NN as a surrogate model. The performance of this surrogate model, in terms of correlation coefficient R, is shown for training data in FIGS. 17B and 18B and test data in FIGS. 17C and 18C. The near unity correlation coefficient displayed on these line plots, which have P-STAC generated ground truth as abscissa and BP-NN predicted data as ordinates, confirms the retrieval of a reliable surrogate model.

Figure 7:
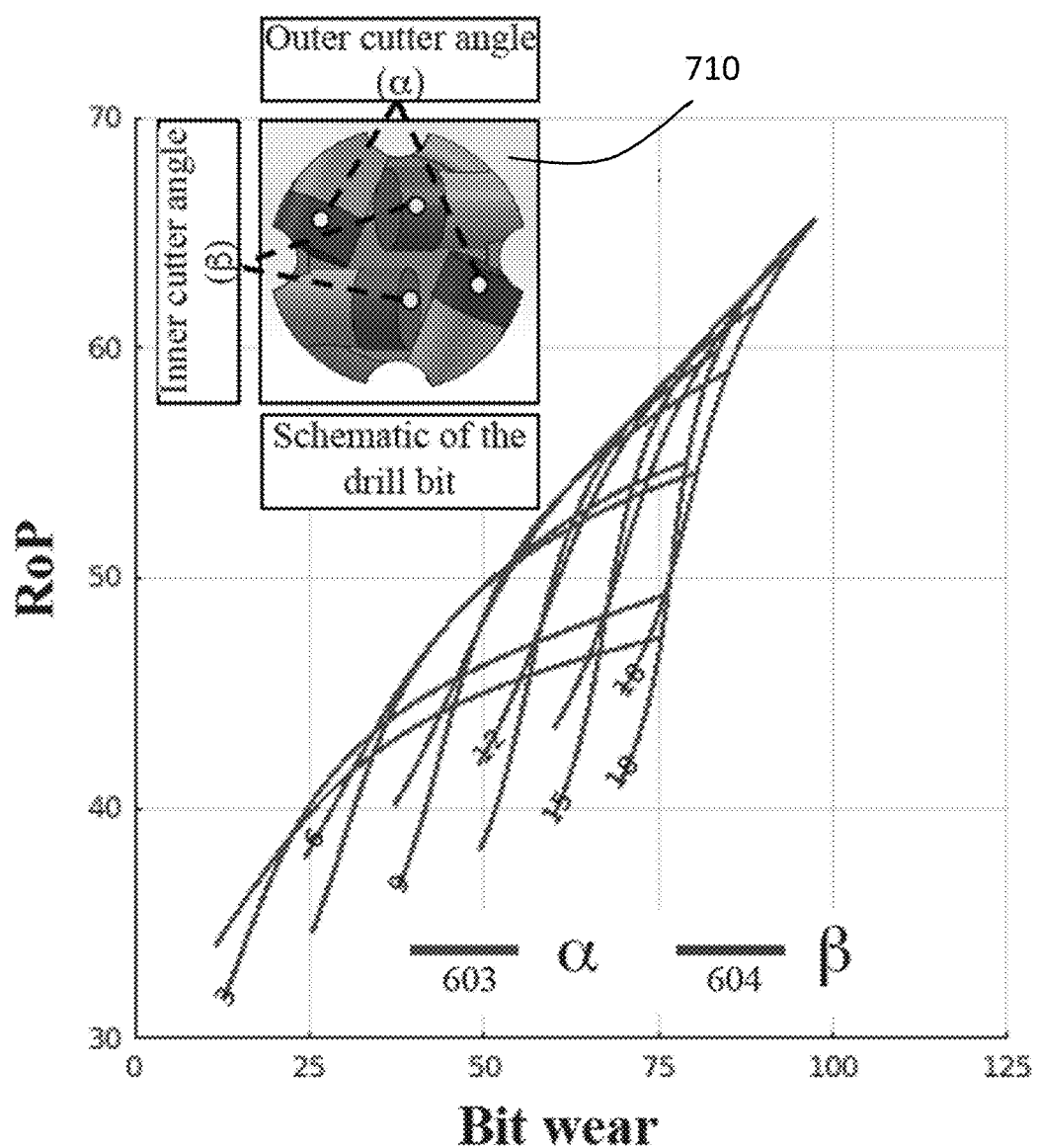
FIG. 7 is a drill bit design chart generated in accordance with a preferred embodiment of the present invention.

The information shown in the surface plots of FIGS. 17A and 18A, can be combined and displayed on a single plot which the inventors refer to as the drill bit design chart as shown in FIG. 7. The X and Y axes of this design chart are the performance variables of bit wear and RoP while the contours show the angles of inner and outer cutters. Such a design chart can be used to schedule the drilling step of oil and gas recovery. This plot allows the user to decipher the drill bit geometry which can excavate a given rock lithology and depth of rock formation, in the minimum time and at minimum costs. It might be feasible to use a drill bit, say drill bit A, with cutter angles $\alpha$ and $\beta$ as 6° and 15° respectively to rapidly drill into a shallower rock formation at the cost of rapid wear of the bit, however a deeper rock formation might be drilled in a faster way by using a low-wearing bit, say drill bit B, with cutter angles $\alpha$ and $\beta$ as 3° and 9° respectively. The aforementioned drill bit A might need replacement, thereby adding to drilling time, for a deeper rock formation.

A synergistic framework based on experiments, physics-based modeling and machine learning enabled surrogate modeling has been presented in these examples to provide rock excavation predictions as relevant to oil and gas recovery and drill bit shape optimization. The physics-based model makes use of GPU-parallelized concrete-like bonded particle DEM and graded mesh CFD. A computational rock comprising of 265,000 spherical particles has been generated and tested for its point load strength. Larger strengths of the sedimentary rocks which can be modeled as concrete-like rocks, mandate extremely high values for the spring stiffness and bond strength of their virtual avatars. This subsequently results in a very low time step and makes the computations which involve 100's of thousands of sub-500 $\mu$m particles, highly expensive. It is shown how to obtain a low-strength concrete-like sedimentary rock to be used for virtual drilling. Then a CFD model based on Newtonian principles and finite differencing in concert with immersed boundary method (IBM) is used to provide promising results as compared to a well-known open source software and experiments involving Newtonian fluids. Use of graded mesh, a form of non-uniform mesh, for local refinement in the regions of interest like regions having vortices or hydrodynamic lubrication within thin fluid films, greatly accelerates a CFD simulation. Then drilling experiments were carried out on two types of sandstone rocks (Castlegate from the energy rich state of Texas and Crab Orchard from Tennessee) under dry and wet conditions. Qualitatively similar results were predicted by the multiphysics model in both dry and wet conditions. This multiphysics rock excavation model was then used to generate virtual drilling data to train a machine learning based surrogate model. The ML surrogate model used to sample the entire design space in a highly refined manner. A drill bit design chart empowers a layman to determine lithology-specific, best performing and cost-effective drill bit.

The foregoing description of the preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments as are suited to the particular use contemplated. It is intended that the scope of the invention be defined by the claims appended hereto, and their equivalents. The entirety of each of the aforementioned documents is incorporated by reference herein.

What is claimed is:

1. A method for designing rock-specific drill bits for a drilling site, comprising:
   characterizing lithology of rock encountered at said drill site;
   using a point load strength test and usage of the data from the point load strength test to calibrate a multiphysics virtual rock, having similar lithological behavior to the rock encountered at the drill site;
   performing experimental benchtop rock drilling, said benchtop drilling simulating high pressure and high temperature conditions encountered at said drilling site;
   performing virtual drilling on said multi-physics virtual rock;
   comparing results of said virtual drilling with results of said experimental benchtop rock drilling;
   training and testing machine learning regression algorithms to generate lithology-specific drill bit design charts, wherein the training and testing utilize the comparative results from the virtual drilling and experimental benchtop rock drilling.

2. The method for designing rock-specific drill bits according to claim 1, further comprising:
   3-D printing a drill bit in accordance with said drill bit design chart.

3. The method for designing rock-specific drill bits according to claim 2, further comprising:
   using said drill bit chart as a lookup chart for drill scheduling software.

4. The method for designing rock-specific drill bits according to claim 1, further comprising:
   using said drill bit chart as a lookup chart for drill scheduling software.

5. The method for designing rock-specific drill bits according to claim 1, further wherein said performing virtual drilling on said multi-physics virtual rock comprises course sampling by varying the number, angle, orientation and placement of the cutters.

6. A method for designing lithology-specific drill bits comprising:
   generating an experimentally verified multiphysics model of a drill site to predict drilling into site-specific rock formations, the multiphysics model using a physics-based, Eulerian-Lagrangian computational modeling framework to predict particle flow and tribological phenomena at the drill site;
   generating virtual drilling data associated with the drill site using the multiphysics model;
   generating a machine learning enabled surrogate model of the multiphysics model of the drill site using the generated virtual drilling data;
   generating a drill bit design chart using said machine learning enabled surrogate model;
   using said drill bit chart as a lookup chart for drill scheduling software; and manufacturing a drill bit in accordance with said drill bit design chart.

7. The method for designing lithology-specific drill bits according to claim 6, further comprising:
   3-D printing a drill bit in accordance with said drill bit design chart.

8. The method for designing lithology-specific drill bits according to claim 6, wherein the machine learning enabled surrogate model comprises a multi-layer neural network.

* * * * *